(12) United States Patent
Cuciurean-Zapan et al.

(10) Patent No.: US 6,343,159 B1
(45) Date of Patent: Jan. 29, 2002

(54) METHOD AND APPARATUS FOR MODELING AND RECONSTRUCTION OF HALFTONED IMAGES

(75) Inventors: Clara Cuciurean-Zapan; Ramesh Nagarajan, both of Fairport; Robert P. Loce, Webster; Jeffrey D. Kingsley, Macedon, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/219,703

(22) Filed: Dec. 23, 1998

(51) Int. Cl.$^7$ .................................................. G06K 9/36
(52) U.S. Cl. ...................... 382/284; 382/294; 345/435; 348/584
(58) Field of Search ................................ 382/284, 266, 382/299, 297, 162, 165, 169, 170, 209; 358/298, 455, 458, 459, 461; 348/584, 588; 345/147, 435

(56) References Cited

U.S. PATENT DOCUMENTS

| | | | |
|---|---|---|---|
| 4,437,122 A | 3/1984 | Walsh et al. | 358/166 |
| 4,630,125 A | 12/1986 | Roetling | 358/280 |
| 4,847,641 A | 7/1989 | Tung | 346/154 |
| 4,933,689 A | 6/1990 | Yoknis | 346/154 |
| 5,005,139 A | 4/1991 | Tung | 364/519 |
| 5,027,078 A | 6/1991 | Fan | 358/456 |
| 5,226,094 A | 7/1993 | Eschbach | 382/309 |
| 5,237,646 A | 8/1993 | Bunce | 395/117 |
| 5,274,472 A | 12/1993 | Williams | 358/455 |
| 5,325,216 A | 6/1994 | Auyeung | 358/479 |
| 5,353,127 A | 10/1994 | Shiau et al. | 358/458 |
| 5,383,036 A | 1/1995 | Mailloux et al. | 358/518 |
| 5,383,086 A | 1/1995 | Wietelmann et al. | 361/152 |
| 5,387,985 A | 2/1995 | Loce et al. | 358/447 |
| 5,506,699 A | 4/1996 | Wong | 358/456 |
| 5,521,989 A | 5/1996 | Fan | 382/270 |
| 5,528,384 A | 6/1996 | Metcalfe et al. | 358/447 |
| 5,579,445 A | 11/1996 | Loce et al. | 395/102 |
| 5,583,659 A | * 12/1996 | Lee et al. | 358/455 |
| 5,659,634 A | 8/1997 | Yeh et al. | 382/232 |
| 5,666,470 A | 9/1997 | Parker | 395/106 |
| 5,696,845 A | 12/1997 | Loce et al. | 382/254 |
| 5,742,325 A | * 4/1998 | Curry et al. | 347/251 |
| 5,758,034 A | 5/1998 | Loce et al. | 395/102 |
| 5,768,432 A | 6/1998 | Schweid | 382/237 |
| 5,809,177 A | 9/1998 | Metcalfe et al. | 382/251 |
| 6,021,256 A | * 2/2000 | Ng et al. | 395/109 |

OTHER PUBLICATIONS

M. Analoui et al., "New Results on Reconstruction of Continuous–Tone from Halftone", Proceedings ICASSP (International Conference on Acoustics, Speech and Signal Processing), pp. 313–316, 1992.

Z. Fan, "Retrieval of Images from Digital Halftones," Proceedings of the International Symposium on Circuits and Systems, pp. 2477–2480, 1992.

(List continued on next page.)

Primary Examiner—Joseph Mancuso
Assistant Examiner—Yosef Kassa
(74) Attorney, Agent, or Firm—Oliff & Berridge, PLC

(57) ABSTRACT

The methods and apparatus of this invention model and reconstruct binarized images. A grayscale image is modeled using a template matching approach. Each binarized grayscale image value is characterized by a unique set of templates which are rotations of each other. The set of templates allows construction of a look-up table between patterns and grayscale values. The look-up table is provided with a limited number of entries. As a result, the number of entries in the look-up table is reduced. The look-up table thus obtained is used for reconstructing the original grayscale image from the binarized image. The generated image quality is good in comparison with conventional methods. The process may be applied to various halftoning processes including error-diffusion processes.

31 Claims, 16 Drawing Sheets

OTHER PUBLICATIONS

S. Floyd et al., "An Adaptive Algorithm for Spatial Grayscale", SID (Society for Information Display), pp. 75–77, vol. 17 No. 2 Second Quarter, 1976.

S. Hein et al., "Reconstruction of Continuous Tone Images from Their Error–Diffused Versions", Proceedings of the Conference on Human Vision, Visual Processing and Digital Display IV, pp. 310–324, (SPIE) vol. 1913, 1993.

C. Miceli et al., "Inverse Halftoning", Journal of Electronic Imaging, pp. 143–151, vol. 1(2), Apr. 1992.

A. N. Netravali et al., "Display of Dithered Images", SID (Society for Information Display) 1980 International Symposium, pp. 185–190, vol. 22 No. 3, 1981.

S. M. Schweisser, "A Bayesian Approach to Inverse Halftoning", Proceedings of the Conference on Human Vision, Visual Processing, and Digital Display IV, pp. 282–292, vol. 1913, Feb. 1993.

M. Y. Ting, "Error–Diffused Image Compression Using a Binary–to–Gray–Scale Decoder and Predictive Pruned Tree–Structured Vector Quantization", IEEE Transactions on Image Processing, vol. 3, No. 6, pp. 854–858, Nov. 1994.

Robert P. Loce et al., "Optimal Morphological Restoration: The Morphological Filter Mean–Absolute–Error Theorem," Journal of Visual Communication and Image Representation, vol. 3, No. 4, pp. 412–432 (12/92).

E.R. Dougherty et al., "Optimal Mean–Absolute–Error Hit–or–Miss Filters: Morphological Representation and Estimation of the Binary Conditional Expectation," SPIE Journal of Optical Engineering, vol. 32, No. 4, pp. 815–827, Apr. 1993.

Paul G. Roetling et al., "Digital Image Processing Methods: Digital Halftoning (10)", Marcel Dekker, Inc. pp. 363–413 (1994).

Robert P. Loce, et al., "Enhancement and Restoration of Digital Documents: Statistical Design of Nonlinear Algorithms", SPIE—The International Society for Optical Engineering, pp. 1–50 and 102–125 (1997).

Becky Colgan ed., *Behind Hewlett–Packard's Patent on Resolution Enhancement™ technology*, Torrey Pines Reaearch, BIS CAP International, 1990, pp. 1–60.

Robert P. Loce et al. ; *Facilitation of Optimal Binary Morphological Filter Design via Structuring Element Libraries and Design Constraints*, Optical Engineering, vol. 31, No. 5, May 1992, pp. 1008–1025.

Edward R. Dougherty ed., Marcel Dekker; *Mathematical Morphology in Image Processing*, pp. 43–90 (1992).

Robert P. Loce and Edward R. Dougherty; *Spatial Resolution Conversion Using Paired Increasing Operators*, Enhancement and Restoration of Digital Document, pp. 202–210, SPIE Optical Engineering Press, 1997.

David R. Cok; *Reconstruction of CCD Images Using Template Matching*, IS&T's $47^{th}$ Annual Conference/ICPS 1994, pp. 380–385.

Edward R. Dougherty et al.; *Optimal binary differencing filters: design, logic complexity, precision analysis, and application to digital document processing*, Journal of Electronic Imaging, Jan. 1996, vol. 5, No. 1, pp. 66–86.

John C. Dougherty et al.; *Model–based optical restoration of fax images in the context of mathematical morphology*, Journal of Electronic Imaging, Apr. 1994, vol. 3, No. 2, pp. 182–189.

* cited by examiner

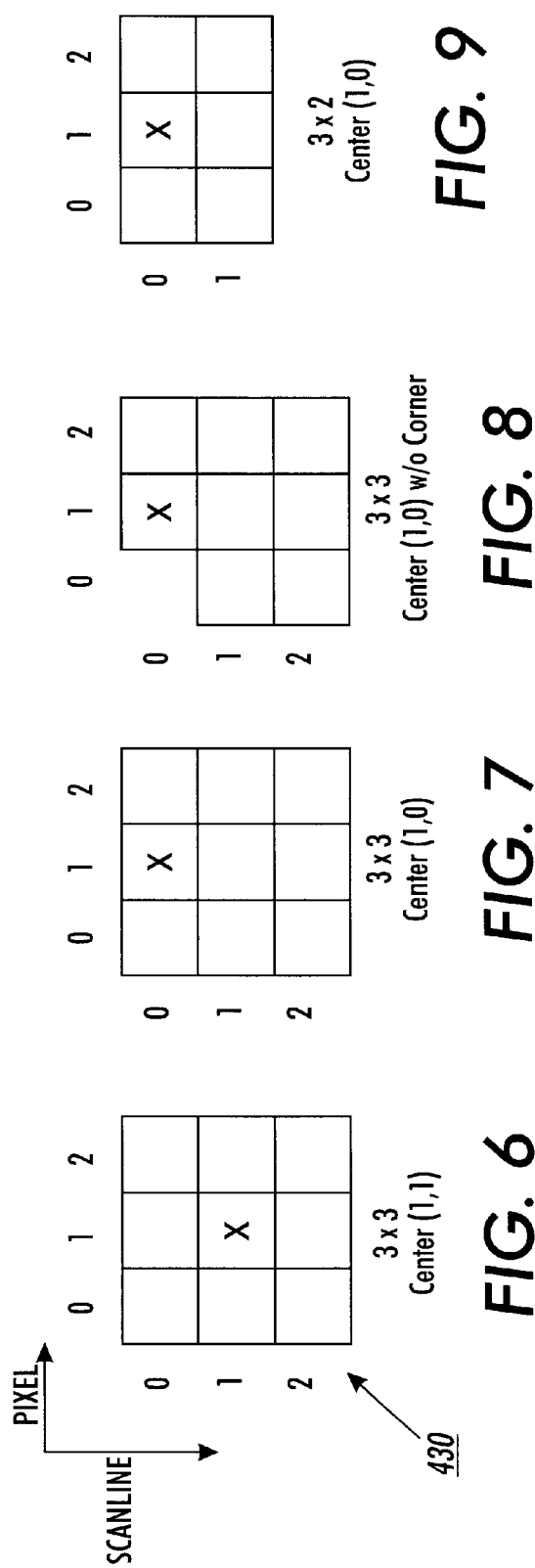

METHOD AND APPARATUS FOR MODELING AND RECONSTRUCTION OF HALFTONED IMAGES

BACKGROUND OF THE INVENTION

1. Field of Invention

This invention relates to methods and systems that model and reconstruct continuous tone or grayscale images from halftoned binary images. More specifically, this invention is directed to methods and systems that convert or reconvert through modeling and reconstruction halftoned binary images into approximations of the original continuous tone images using template matching.

2. Description of Related Art

Conventionally, a typical black and white image on photographic film, for example, includes various gray levels of light. That is, different amounts of light are reflected from various spots of the image on the film, providing what is known as a continuous tone photographic image. It is conventionally known how to digitize the grayscale continuous tone photographic image. More specifically, each pixel or spot of the photographic image is assigned a number representing the amount of light or gray level of that particular spot. Typically, an eight-bit word is used, giving 256 different digitized gray levels of light. The digitized image is known as a continuous tone digital image. Further, it is possible to go back and forth between the analog and digital images and maintain a reasonable reproduction of the image.

It is also conventionally known to provide an image on a recording medium, for example, a paper sheet, rather than on photographic film. For example, a modulated laser can be used to scan a xerographic drum to give a series of black and white spots. The spots are formed by turning the laser on and off. The image on the drum is then developed and transferred to a copy sheet. This process of developing black and white spots provides a binary image, but does not generate a continuous tone image.

It is possible, however, to give the impression of a continuous tone image by using halftoning. The halftone process uses a mathematically stored screen pattern, for example, which is an almost-sinusoidal two-dimensional pattern. The process converts the original or continuous tone image into an image of black and white spots that "appears" to be a continuous tone image. This process is generally accomplished by systematically comparing each pixel's continuous tone value with the value of the screen. If the continuous tone value of the pixel is less dense than the screen value, then a white spot is produced. On the other hand, if the pixel value is more dense than the screen value, a black spot is produced. It should be understood that the pixel values are the 8-bit grayscale values for each pixel of the original image.

In effect, this procedure converts a grayscale image into black and white spots, but gives the impression of multiple gray levels by producing more white spots for a less-dense area and more black spots for a denser area. Although a true continuous tone image is not produced by this procedure, the procedure has two advantages. One advantage is that each spot of the image is described with one bit, rather than the eight-bit word used for each gray level pixel in the original continuous tone picture. This allows the halftone image to be stored with approximately ⅛ of the storage of the original continuous tone image. Another advantage is that, in fact, a halftone image can be printed on paper. In other words, the conversion takes each eight-bit pixel value representing a grayscale value, compares the pixel value to a screen value and provides either a zero (0) or a one (1) to modulate the laser. This image can then be printed on a recording medium such as paper.

Another known halftoning method is called error-diffusion. Typical applications of error diffusion include viewing continuous tone images on low resolution displays and generating bitmaps for binary printers. Error diffusion is an adaptive binarization process which has the property of preserving the local average gray level of the input continuous tone image. Specifically, error-diffusion propagates the error generated during binarization to neighboring pixels.

SUMMARY OF THE INVENTION

Accordingly, if all that is required is printing of the stored halftone image, then there is no difficulty. However, if it becomes necessary to modify the image, for example, to magnify or to change the tone scale, the continuous tone image is often not available. It is then necessary to go back to the original continuous tone image, with the eight-bit words representing the grayscale value of each pixel, to make the modification. However, because this original image requires eight times the storage capacity of the stored halftone image, it is often no longer available. If the original image is no longer available, then the halftone image needs to be converted back to an estimated grayscale image, which represents the original continuous tone image. Clearly, reversing the halftoning process should be performed as accurately and efficiently as possible.

The process of digital inverse halftoning is the process of reconverting a binary image into an approximation of the original grayscale image. Inverse halftoning can be applied to a wide variety of binary image processing applications. Illustratively, inverse halftoning may be used in conjunction with scaling, tone correction, interchanging between halftone methods, facsimile image processing, non-linear filtering, enhancement and/or image compression, for example.

Image conversion between a binary image and a grayscale image is often necessary. Illustratively, image conversion may be necessary where multiple devices are connected together and must communicate with each other. For example, devices such as a scanner, a personal computer or a facsimile machine may be connected such that they are in communication with each other. Often a network is utilized to connect these various devices. In a networked environment, images may be preprocessed for a particular printer. However, it may be necessary to transmit or communicate these images to a second, different, printer. The second printer may have a different printing strategy than the first printer. For example, the second printer could have a different resolution, a different tonal response, and/or a different halftoning method than the first printer. Under such conditions, it may be necessary or desirable to recover the grayscale image information and perform device specific corrections before printing.

It should be appreciated that it is impossible to exactly reverse the halftoning process to recreate the original continuous tone image, since some information has been lost during halftoning and is simply not recoverable. However, just as the halftone image gives the visual impression of grayscale values, conventional methods may be used to reconstruct an approximation of the original continuous tone image.

A partial solution known in the art approximates the original continuous tone image by spatially filtering the halftone image with a low pass filter. This process uses an averaging procedure on the halftone image and yields a reconstructed continuous tone image. The reconstructed image, however, provides a blurred image without sharp lines.

Further, there are a number of other conventional methods and approaches to inverse halftoning. Some of these conventional methods relate to dithered images. When using dithered images, one technique utilizes a neighborhood approach. The neighborhood approach uses adaptive run lengths of 1's and 0's, referred to as the adaptive binary run length (ABRL). This method performs particularly well in a three-step cascade algorithm comprised of ABRL, statistical smoothing and impulse removal.

Thus, the conventional methods and techniques described above have various shortcomings associated with them. Specifically, the conventional methods and techniques described above do not provide optimized methods to perform inverse halftoning to convert halftoned binary images into approximations of the original continuous tone image.

Accordingly, this invention provides improved systems and methods that model and reconstruct grayscale images from halftoned images.

This invention separately provides systems and methods that match templates to pixel patterns in the halftone images.

This invention separately provides systems and methods that reconstruct a grayscale image from a binary image by matching patterns of pixels that occur in the binary image to corresponding grayscale values.

This invention separately provides systems and methods that develop a correspondence between grayscale values and patterns of pixels in a binary image based on a baseline image and a binary image generated from the baseline image.

This invention separately provides systems and methods that develop a correspondence between grayscale values and classes of patterns of pixels in a binary image, where the classes are formed by rotations of the pixel patterns.

This invention separately provides systems and methods that model and reconstruct grayscale images from halftone images while still maintaining a relatively sharp image by not blurring the grayscale image.

According to one exemplary embodiment of the systems and methods according to this invention, a look-up table is optimally generated using a set of one or more training images. A given bit pattern will have a specific number of occurrences in a training sequence. For all the occurrences of a given bit pattern in a training sequence, the corresponding gray levels in the training sequence are recorded. The mean value of the graylevels for a corresponding bit pattern is computed. The mean value, thus computed, will be the gray level corresponding to the given bit pattern. Thus, in this exemplary embodiment of the systems and methods of this invention, the inverse halftoning systems and methods essentially perform a decoding operation. More specifically, the decoder of the decoding operation is implemented using the look-up table. The look-up table associates a particular grayscale value with a particular bit pattern.

Illustratively, as described in the various embodiments of the invention discussed herein, the methods and systems of the invention may be applied to error-diffused images. However, it should be recognized that the systems and methods of the invention are not limited to error-diffused images. Rather, the systems and methods of the invention may be used in conjunction with a variety of halftoning processes. For example, the systems and methods of the invention may also be used in conjunction with images that have been converted using an ordered dither method, for example.

In accordance with one exemplary embodiment of the systems and methods of this invention, a training process is initially performed. The training process involves a template matching process. The template matching process is trained based on a test pattern image. The correspondence between certain templates of pixels in a binary image formed from the test pattern image and the grayscale values of the test pattern image for the certain templates is generated by converting the grayscale test pattern to a halftone image. The pixel patterns resulting from each grayscale level of the test pattern are recorded. The recorded grayscale values are then used in place of a target pixel of the corresponding pixel patterns when generating a reconstructed grayscale image from the halftoned image.

Illustratively, a continuous tone grayscale image may be converted to a binary image for various reasons including, for example, electronic storage limitations. The binary image may be in the form of an error-diffused halftone image. In accordance with the systems and methods of this invention, it has been recognized that portions of the binary image form patterns of pixels. These patterns may be characterized by a unique set of templates. Certain pixel patterns are 90 degree rotations of each other. The method and systems of the invention use this relationship between certain pixels to increase the efficiency of the inverse halftoning process. The unique set of templates allows efficient construction of a look-up table. The look-up table provides an association between a set of one or more specific pixel patterns in a binary image and a grayscale value associated with the one or more patterns.

In accordance with the systems and methods of this invention, the look-up table is provided. According to systems and methods of this invention, an observation window is used to select pixels as input patterns to the look-up table. Illustratively, a 3×3 observation window may be used. The look-up table can have a reduced number of entries due to the fact that some patterns that characterize a particular gray level are rotations of each other. For example, the number of entries in the look-up table may be reduced to 132 entries. The look-up table thus obtained is used for reconstructing an accurate 8-bit recreation of the original grayscale image. As a result of the systems and methods according to this invention, the peak signal to noise ratio (PSNR) is greatly increased compared to the conventional methods. The systems and methods of this invention may also be applied to error-diffused color images by generating and using a look-up table for each of the color separation layers.

These and other features and advantages of the systems and methods of this invention are described in or are apparent from the following detailed description of the exemplary embodiments.

BRIEF DESCRIPTION OF THE DRAWINGS

The exemplary embodiments of this invention will be described in detail, with reference to the following figures, wherein:

FIG. 6 is a diagram showing one exemplary window in accordance with this invention;

FIG. 7 is a diagram showing another exemplary window in accordance with this invention;

FIG. 8 is a diagram showing another exemplary window in accordance with this invention;

FIG. 9 is a diagram showing another exemplary window in accordance with this invention;

DETAILED DESCRIPTION OF PREFERRED EMBODIMENTS

Figure 1:
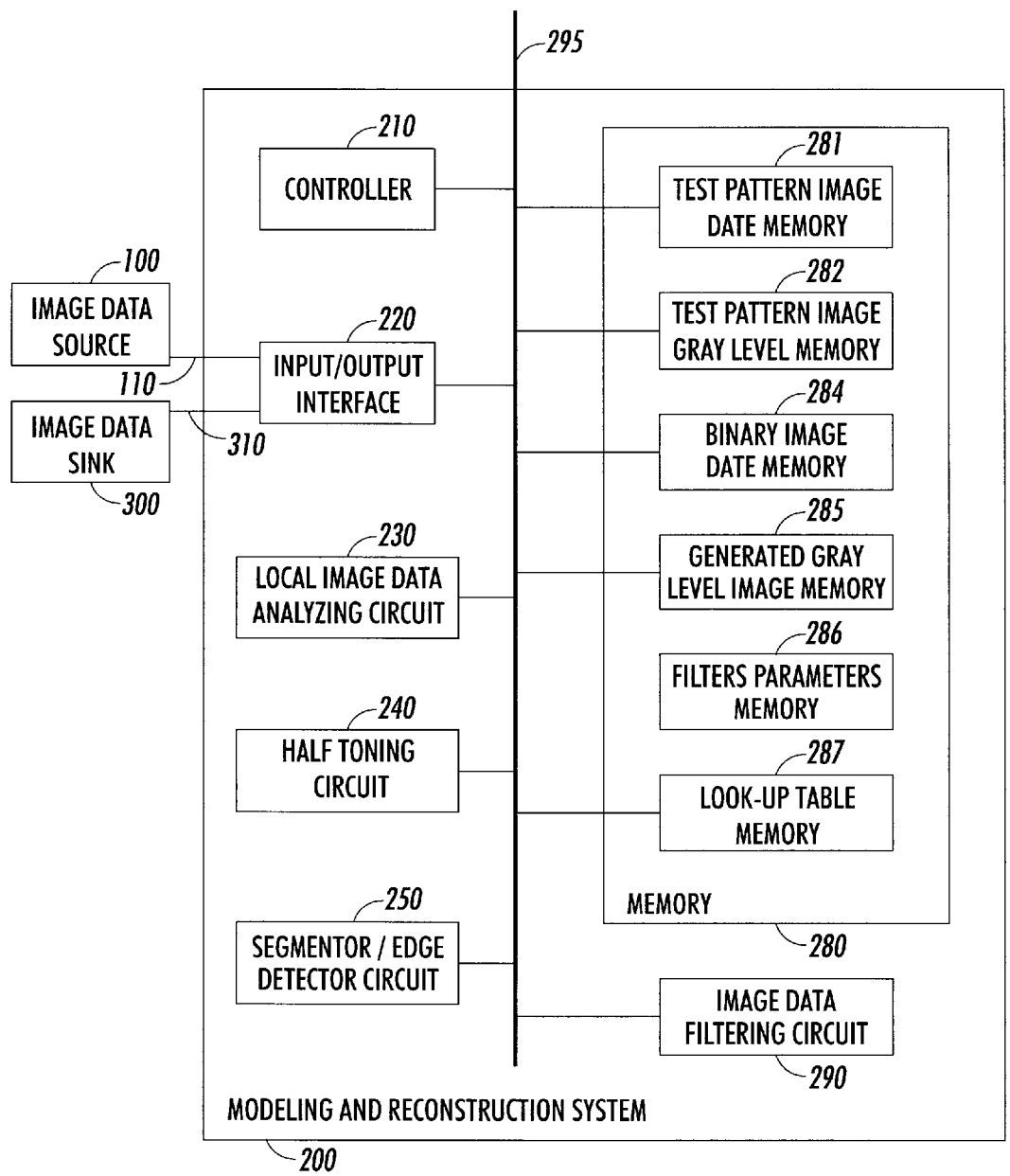
FIG. 1 is a functional block diagram of one exemplary embodiment of a system for modeling and reconstructing grayscale images in accordance with this invention.

FIG. 1 shows one exemplary embodiment of a generalized functional block diagram of a modeling and reconstruction system 200, in the form of a general purpose computer, according to this invention. The modeling and reconstruction system 200 is connected to an image data source 100 over a signal line or link 110 and to an image data sink 300 over a signal line or link 310. The image data source 100 provides grayscale and/or halftone image data to the modeling and reconstruction system 200. The image data sink 300 receives the reconstructed or converted images output by the modeling and reconstruction system 200.

In general, the image data source 100 can be any one of a number of different sources, such as a scanner, a digital copier, a facsimile device that is suitable for generating electronic image data, or a device suitable for storing and/or transmitting electronic image data, such as a client or server of a network. Further, the image data source 100 does not necessarily have to be a single device, but rather may be formed by two or more separate devices. For example, one device may store the test pattern image data while the other device provides the binary image data.

Thus, the image data source 100 can be any known or later developed source that is capable of providing halftone and/or test pattern image data to the modeling and reconstruction system 200 of this invention. Similarly, the image data sink 300 can be any known or later developed device that is capable of receiving the reconstructed grayscale image data output by the modeling and reconstruction system 200 and either storing, transmitting, and/or displaying that reconstructed grayscale image data. Thus, the image data sink 300 can be either or both of a channel device for transmitting the reconstructed grayscale image data for display or storage or a storage device for indefinitely storing the reconstructed grayscale image data until there arises a need to display or further transmit the reconstructed grayscale image data.

Further, the image data sink 300 or channel device can be any known structure or apparatus for transmitting the reconstructed grayscale image data from the modeling and reconstruction system 200 to a physically remote storage or display device. Thus, the channel device can be a public switched telephone network, a local or wide area network, an intranet, the Internet, a wireless transmission channel, any other distributing network, or the like. Similarly, the storage device can be any known structural apparatus for indefinitely storing the reconstructed grayscale image data, such as a RAM, a hard drive and disk, a floppy drive and disk, an optical drive and disk, a flash memory or the like. Finally, the display device can be any known device for displaying or rendering an image. Thus, the display device can be a CRT, an active or passive matrix LCD, an active or passive LED display, a laser printer, an ink jet printer, a digital copier, or the like.

Moreover, the image data source 100 and the image data sink 300 can be physically remote from the modeling and reconstruction system 200 and reachable over the channel device described above. Alternatively, the modeling and reconstruction system 200 can be integrated with either or both of the image data source 100 and the image data sink 300. For example, the image data source 100 can be a scanner of a digital photocopier, while the image data sink 300 is an image output terminal of the digital photocopier.

As shown in FIG. 1, the modeling and reconstruction system 200 includes a controller 210, an input/output interface 220, a local image data analyzing circuit 230, a halftoning circuit 240, a segmenter/edge detector circuit 250, a memory 280, and an image data filtering circuit 290, each of which is connected to a data and/or control bus 295. The input/output interface 220 is also connectable to the image data source 100 and the image data sink 300 over the signal lines or links 110 and 310, respectively.

Additionally, as shown in FIG. 1, the memory 280 includes a test pattern image data memory 281, a test pattern image grayscale memory 282, a binary image data memory 284, a generated grayscale image memory 285, a filters parameters memory 286 and a look-up table memory 287. The test pattern image data memory 281 stores test pattern image data received from the image data source 100 through the input/output interface 220. The test pattern image grayscale memory 282 stores analyzed grayscale value information for the test pattern. The binary image data memory 284 stores binary image data received from the image data source 100 through the input/output interface 220 and also binary image pattern number data generated in the local image data analyzing circuit 230. The generated grayscale image memory 285 stores grayscale image data generated in the local image data analyzing circuit 230. The filter parameters memory 286 stores various filter parameters for refining the generated grayscale images. The look-up table memory 287 stores look-up table data generated by the local image data analyzing circuit 230.

The memory 280 also stores any necessary control programs and/or data required by the modeling and reconstruction system 200. Thus, the memory 280 can be implemented using static or dynamic RAM, a floppy disk and disk drive, a writable optical disk and disk drive, a hard disk and disk drive, flash memory, or the like. The memory 280 can also include read only memory, including CMOS memory PROMs, EPROMs, EEPROMs, a CD-ROM and disk drive, or the like.

In accordance with the systems and methods of this invention, a grayscale image may be modeled and reconstructed from a binary image using the modeling and reconstruction system 200 shown in FIG. 1. However, to accomplish this, it is first necessary to perform a modeling process, i.e., a training process. The modeling process involves matching templates with a particular pattern in the binary image, i.e., a template matching process. The template matching process during training results in the creation of a look-up table, which is subsequently used by the matching process during inverse halftoning.

Figure 2:
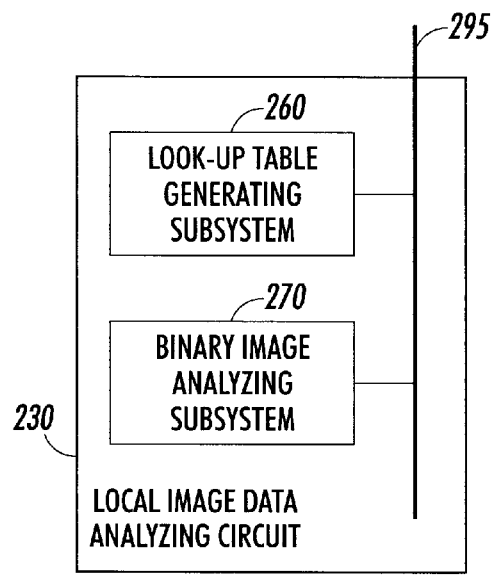
FIG. 2 is a functional block diagram showing one exemplary embodiment of the local image data analyzing circuit of FIG. 1 in accordance with this invention.

FIG. 2 is a functional block diagram showing one exemplary embodiment of the local image data analyzing circuit 230 of FIG. 1 in greater detail. As shown in FIG. 2, the local image data analyzing circuit 230 includes a look-up table generating subsystem 260 and a binary image analyzing circuit 270. The look-up table generating subsystem 260 creates the look-up table in accordance with the systems and methods of this invention. The binary image analyzing circuit 270 analyzes a binary image using the look-up table created by the look-up table generating subsystem 260.

Figure 3:
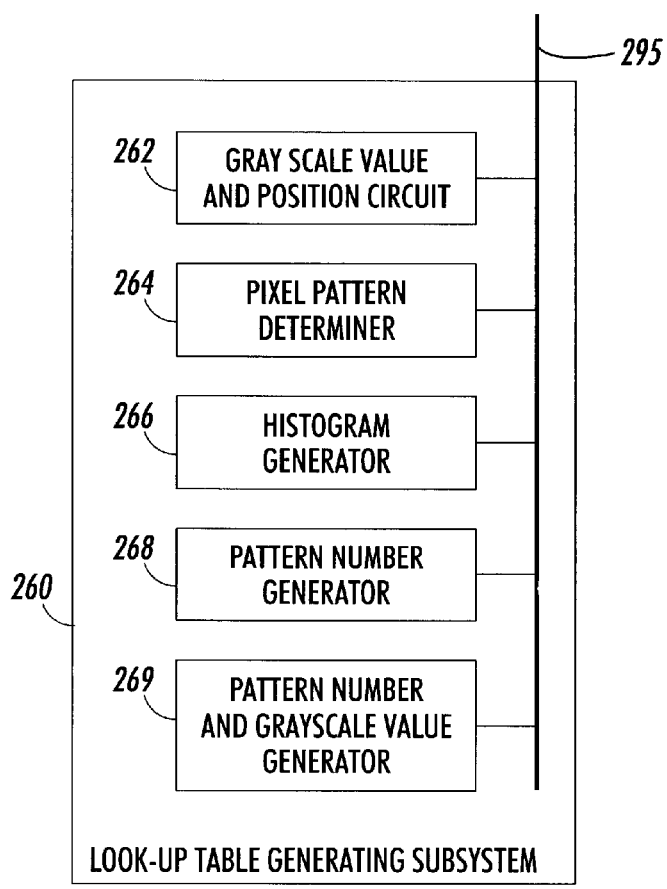
FIG. 3 is a functional block diagram showing one exemplary embodiment of the look-up table generating subsystem of FIG. 2 in accordance with this invention.

FIG. 3 is a functional block diagram showing one exemplary embodiment of the look-up table generating subsystem 260 of FIG. 2 in greater detail. As shown in FIG. 3, the look-up table generating subsystem 260 includes a grayscale value and position circuit 262, a pixel pattern determiner 264, a histogram generator 266, a pattern number generator 268, and a pattern number and grayscale value associator 269, each connected to the data bus 295.

The grayscale value and position circuit 262 analyzes the test pattern image to determine both the grayscale value of each portion of the test pattern image and the location of each pixel within each portion of the test pattern image. The pixel pattern determiner 264 analyzes the binary image data generated from the test pattern image to determine the pixel patterns that occur within the binary image generated from the test pattern image. The pattern number generator 268 generates, for each different observed pattern, a unique pattern number. The histogram generator 266 generates a two dimensional histogram that relates the frequency distribution of pattern numbers relative to the grayscale values and vice versa. That is, a grayscale value that often corresponds to a particular pattern number will have a high frequency of occurrence, while a particular grayscale value that rarely corresponds to a particular pattern number will have a low, or zero-value frequency of occurrence. Conversely, a pattern number that often corresponds to a particular grayscale value will have a high frequency of occurrence, while a particular pattern number that rarely corresponds to a particular grayscale value will have a low, or zero-value frequency of occurrence. The pattern number and the grayscale value associator 269 generates look-up table entries that convert a particular pattern number, used as an address into the look-up table, to a grayscale value output from the entry indicated by the address value. In particular, the grayscale value that will be associated with each pattern number may be the grayscale value having the highest frequency of occurrence for each particular pattern number.

Figure 4:
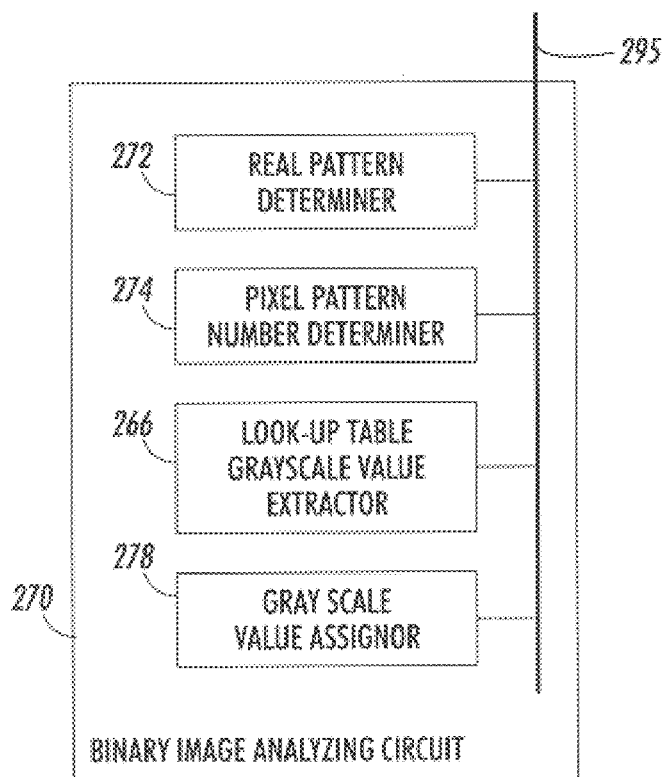
FIG. 4 is a functional block diagram showing one exemplary embodiment of the binary image analyzing circuit of FIG. 2 in accordance with this invention.

FIG. 4 is a functional block diagram showing one exemplary embodiment of the binary image analyzing circuit 270 of FIG. 2 in greater detail. As shown in FIG. 4, the binary image analyzing circuit 270 includes a pixel pattern determiner 272, a pixel pattern number determiner 274, a look-up table grayscale value extractor 276, and a grayscale value assignor 278, each connected to the data bus 295.

The pixel pattern determiner 272 observes and analyzes pixel patterns in an input image. The pixel pattern number determiner 274 generates pattern numbers based on the observed pixel patterns. The look-up table grayscale value extractor 276 extracts grayscale values from a look-up table based on an observed pixel pattern number. Further, the grayscale value assignor 278 assigns each pixel in the input image an appropriate grayscale value.

To initially generate a look-up table, the controller 210 inputs a grayscale test pattern from the image data source 100 through the link 110. The test pattern image is then stored in the test pattern image data memory 281. In the exemplary embodiments of the systems and methods of the invention described herein, the test pattern image may be constructed with a plurality of constant patches. Each patch contains a plurality of pixels. The grayscale value of all the pixels within a particular patch is uniform.

Figure 5:
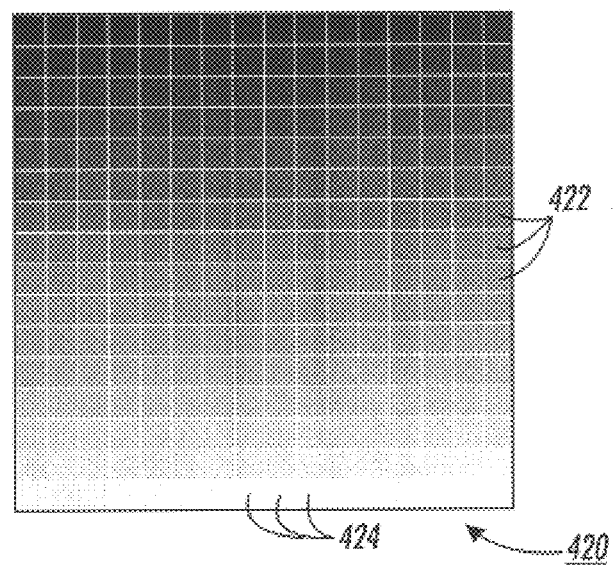
FIG. 5 is an exemplary test pattern image used for modeling an error-diffused image in accordance with this invention.

Illustratively, FIG. 5 shows a test pattern image 420 usable in accordance with the systems and methods of this invention. The test pattern image 420 includes an array of constant-valued patches, including a plurality of rows 422 and columns 424. Each row 422 includes 16 patches and each column 424 includes 16 patches. In total, the number of patches is 16*16=256. The grayscale value of the patches varies between 0 to 255, as shown in FIG. 5. In the exemplary grayscale test pattern image 420, each individual patch includes 100×100 pixels. During experimentation to develop the exemplary systems and methods of this invention, this number of samples proved to be sufficient for the statistical analysis, as described below. However, it should be recognized that properties of the test pattern, including the particular number of pixels per patch utilized, the geometry of the test pattern, the number of patches, and the interrelationship between the respective patches, may be widely varied depending on the particular application, and that the systems and methods of the invention are not limited to the test pattern shown in FIG. 5. Rather, any suitable test pattern image may be utilized.

FIG. 6 shows one illustrative example of a 3×3 sliding window 430. As shown in FIG. 6, the 3×3 sliding window 430 includes an array of pixels including 3 rows, with vertical coordinates 0 to 2, respectively, and three columns, with horizontal coordinates 0–2, respectively. The horizontal axis represents the fast scan direction. Further, the vertical axis represents particular pixels in the slow scan direction. The sliding window includes a target pixel. For example, the sliding 3×3 window 430 includes a center or target pixel 432 located at the coordinates (1,1). The target pixel 432 is used to analyze the binarized image stored in the binary image data memory 284. However, it should be recognized that various other types of windows may be used by the modeling and reconstruction system 200.

Specifically, alternative types of windows are shown in FIGS. 7–9. These windows, as well as others, may be used by the modeling and reconstruction system 200 in accordance with the invention in place of the window 430. For example, FIG. 7 shows a 3×3 window with the center or target pixel positioned at the coordinates (1,0). Further, the particular window to be used is not limited to a 3×3 window. Illustratively, FIG. 8 shows a window having a slightly varied, asymmetrical array. Further, FIG. 9 shows a window formed into a 3×2 array with the target pixel at (1,0).

A slightly different technique is employed, for example, when using the window shown in FIG. 7. In the window shown in FIG. 7, information generated for the target pixel will not depend upon the neighboring pixel directly above the target pixel. Instead, information for the target pixel will depend upon a 3×3 array in which the target pixel is the top center pixel as shown in FIG. 7.

It should be recognized that the particular sliding window used in any grayscale image reconstruction system or method according to this invention will depend on the particular requirements of that application. Additionally, the particular location of the target pixel within the sliding window will depend on the requirements of the particular grayscale image reconstruction system or method according to this invention used in a particular application.

Figure 10:
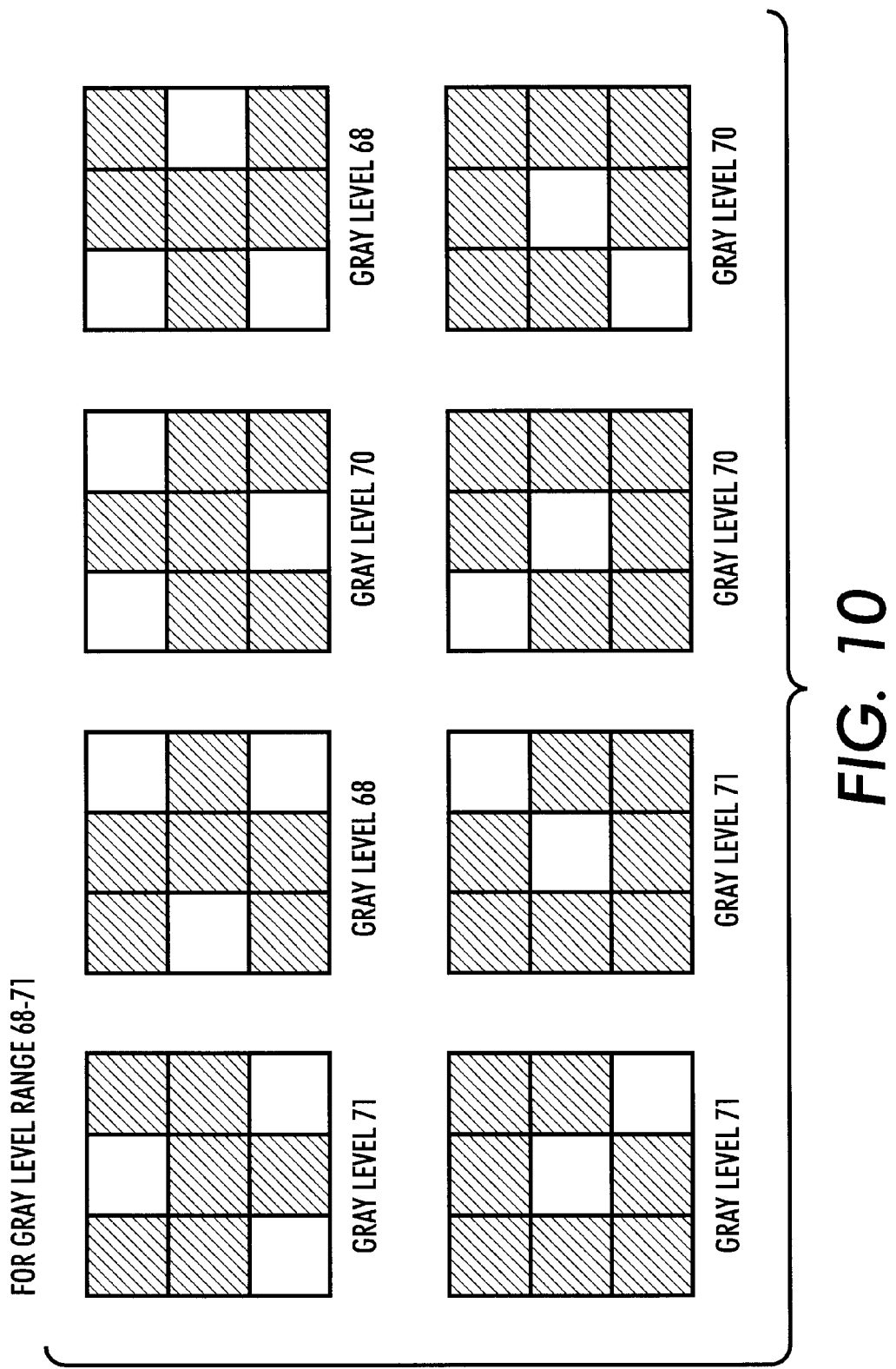
FIG. 10 is a diagram showing an arrangement of close grayscale values having patterns that are rotations of each other in accordance with this invention.

It should be appreciated that, in accordance with the systems and methods of the invention, each grayscale value can be associated with a corresponding binary image having a certain pattern and the symmetries and/or rotations of that pattern. In other words, numerically similar grayscale values result from patterns that are similar to, or rotations of, each other. As an example, FIG. 10 shows 8 patterns of a binary image associated with mean grayscale values between 68 and 71. Accordingly, each pattern, or a 90 degree rotation of that pattern, will correspond most often to the same grayscale value. Further, it should be recognized that, as used herein, a "90 degree rotation of a pattern" means a rotation of 90° or a rotation that is a multiple of 90°, i.e., 90°, 180°, or 270°.

Figure 11:
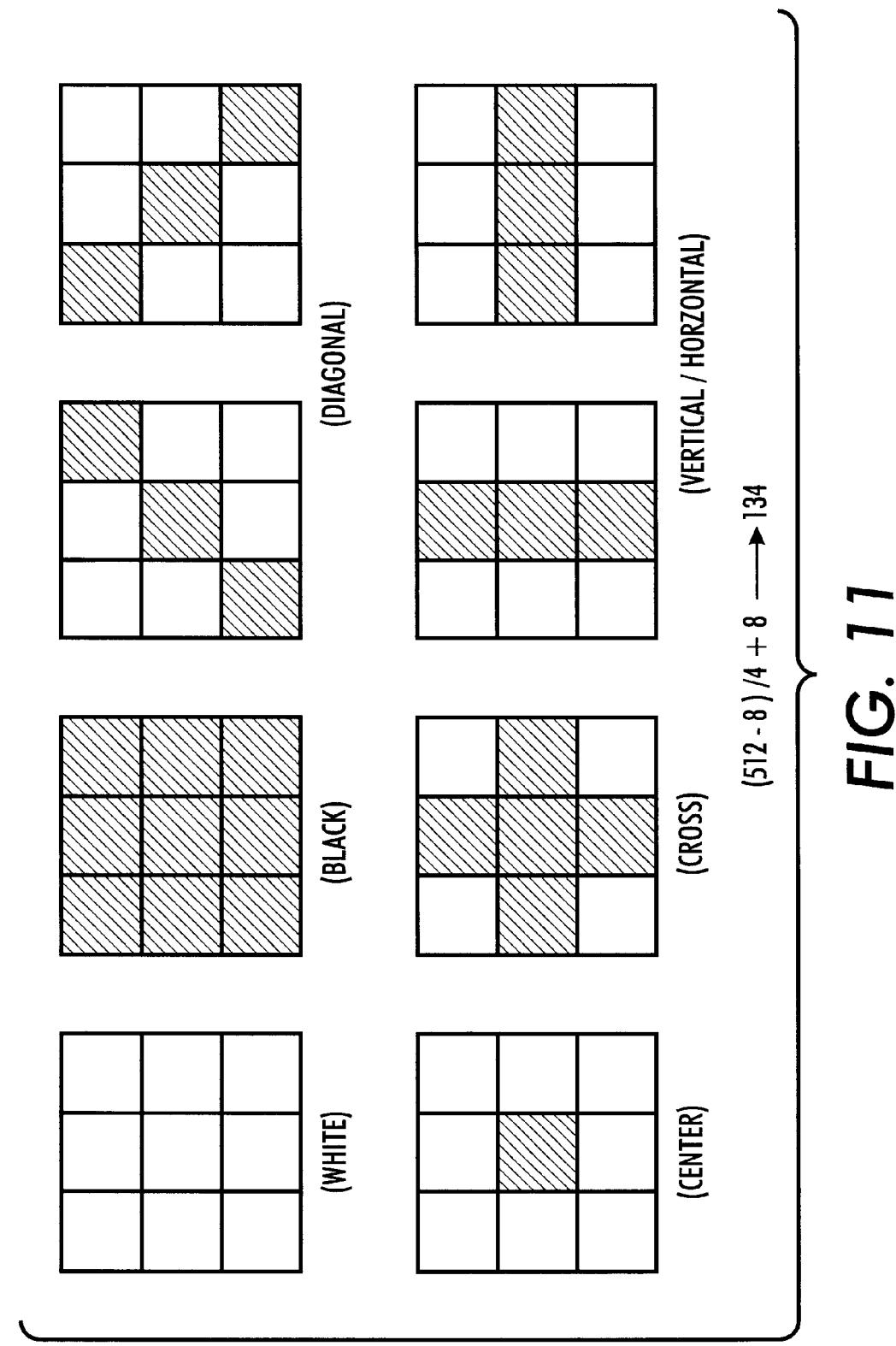
FIG. 11 is a diagram showing a set of patterns that do not yield four distinct rotations in accordance with this invention.

It should also be appreciated that the majority of patterns have three corresponding rotations, i.e., there are four corresponding rotations in total. However, a few of the patterns do not have three corresponding rotations. Specifically, as shown in FIG. 11, these patterns without three corresponding distinct rotations include a white pattern, a black pattern, two diagonal patterns, a center pattern, a cross pattern, a vertical pattern, and a horizontal pattern. For example, the white pattern, the black pattern, the center pattern and the cross pattern have no corresponding distinct rotation patterns. Further, the two diagonal patterns and the vertical and horizontal patterns are rotations to each other.

The modeling and reconstruction system 200 uses the fact that each grayscale value can be associated with a corresponding binary image having a certain pattern, or rotations of that pattern. Based on this association, the look-up table is generated. The look-up table includes entries that associate a particular binary image pattern with a particular grayscale value. Furthermore, because each grayscale value is also associated with rotations of that pattern, the number of entries in the look-up table can be greatly reduced.

In particular, in the binary image, each pixel may be either white (0) or black (1). When using the sliding window 430 shown in FIG. 6, the sliding 3×3 window 430 covers a particular neighborhood of pixels at any given time. The local image data analyzing circuit 430 determines which of the pixels in the neighborhood are white or black. A total of nine pixels are selected by the sliding window 430 at any given time. As a result, there are 512 (2⁹) possible patterns for the 9 pixels in the sliding window 430. However, a large number of these 512 patterns are rotations of some other pattern.

Thus, in accordance with the systems and methods of the invention, the analysis of the binary image can be simplified and the necessary storage capacity can be reduced by storing only one pattern of each set of rotated patterns that result in almost the same grayscale value. Specifically, as discussed above with respect to FIGS. 10 and 11, there are 126 sets of 4 rotated patterns that generate essentially the same grayscale value, and 4 patterns that do not have any corresponding distinct rotated patterns, and 2 sets of patterns that rotate to each other only. As a result, for each set of four rotated patterns, one representative pattern can be used to form the look-up table, instead of the four. Thus, instead of the look-up table having 512 entries, all the look-up table will have is 134 entries corresponding to the 126 sets of 4 patterns and the eight patterns shown in FIG. 11. It should also be appreciated that the number of entries in the look-up table may be further slightly reduced to 132 by taking into account that the two diagonal patterns are rotations of each other, as are the vertical and the horizontal patterns.

Figure 12:
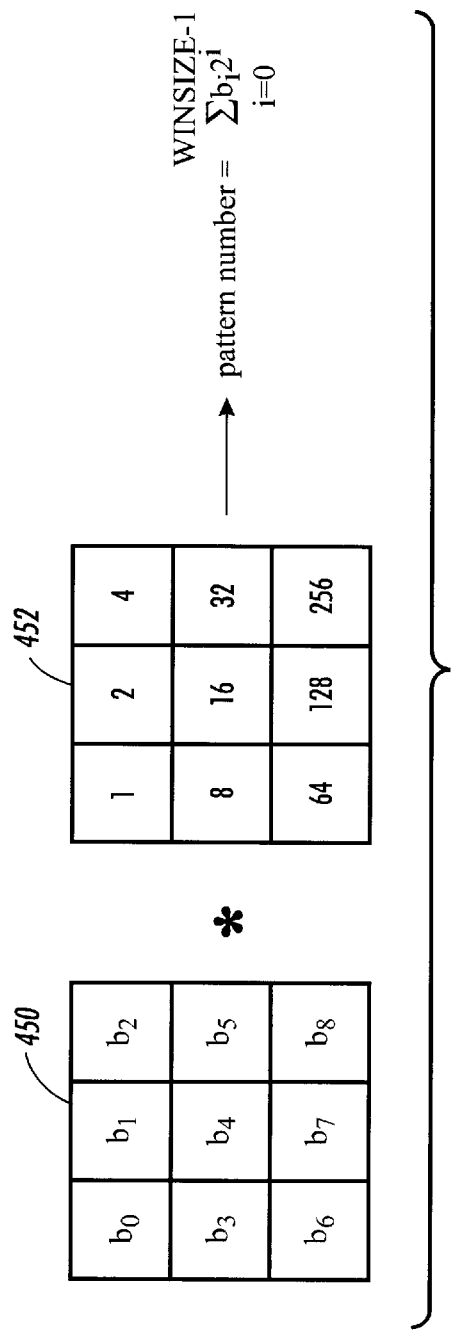
FIG. 12 is a diagram showing a representative window and the values associated with each position of the pixels in the window for determining an original pattern number in accordance with the invention.
Figure 13:
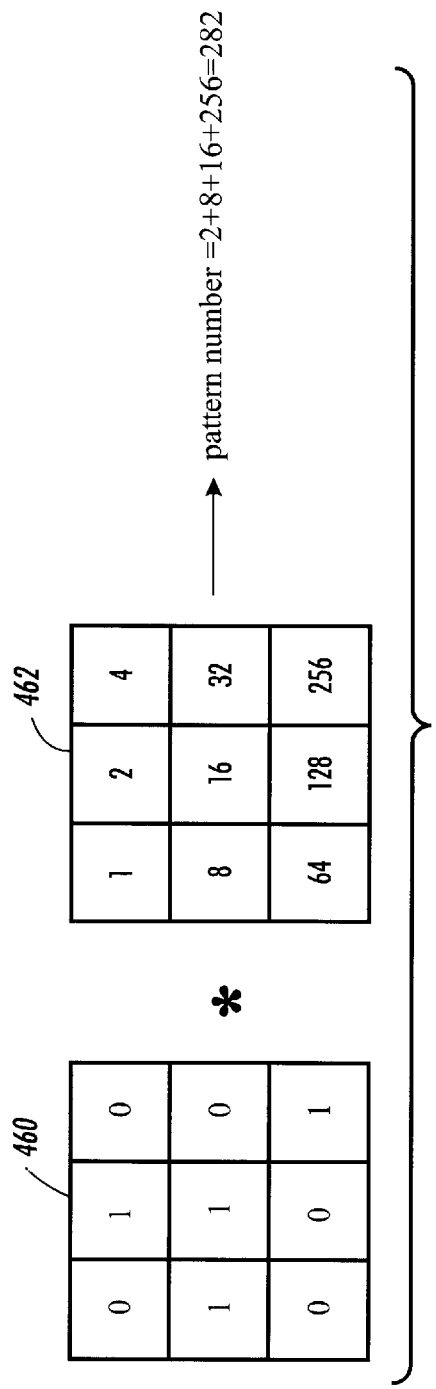
FIG. 13 is a diagram showing an illustrative bitmap and the values associated with each position of the pixels in the window for determining an original pattern number for the illustrative bitmap in accordance with the invention.

FIGS. 12 and 13 demonstrate one exemplary technique for determining the original pattern number. FIG. 12 shows how the binary image values for the pixels $b_0$–$b_8$ are multiplied by position-dependent weighting to generate a pattern number from the pattern observed in the 3×3 window 430. Specifically, FIG. 12 shows a bitmap 450 and a bytemap 452. The bitmap 450 represents the binary pixels $b_0$–$b_8$ that have binary image values.

Thus, the pattern number for each respective pattern observable in the window 430 is obtained by multiplying the bitmap 450 by the bytemap 452. Specifically, the original pattern number PN is obtained by the equation:

$$PN = \sum_{i=0}^{k-1} b_i P_i \tag{1}$$

where:
i is the position of a pixel in the window;
$b_i$ is the binary image value for the pixel at position i;
$P_i$ is the position dependent weighting at the position i; and
k is the number of pixels in the window.

As shown in FIG. 12, the bitmap 450 includes the representative pixels $b_i$ where i=0 to 8. The binary pixel values of the pixels $b_0$–$b_8$ in the bitmap 450 are multiplied by the position dependent weight $P_i$ of the bytemap 452. The position-dependent position values $P_i$ for the pixels in the bytemap 452 are determined based on the relationship:

$$P_i = 2^i \tag{2}$$

FIG. 13 shows an example of determining an original pattern number from the patterns observed in the 3×3 window 430. Multiplying the binary image values in the bit map 460 by the position dependent grayscale values in the byte map 462 result in the pattern number "282" for the binary image pattern shown in the bitmap 460.

Illustratively, for each original pattern number i observed in the 3×3 window 430, the corresponding grayscale value j from the corresponding 3×3 window in the original test pattern image is recorded in both a gray level histogram array "Grayhist$_j$" and in Grayhist$_{rot(j)}$. The frequency $f_{ij}$ of each pattern j observed for a given graylevel i is also stored both in the corresponding pattern histogram Pathist$_j$ and in Pathist$_{rot(j)}$. Once the histogram generator 266 has analyzed all of the pixels in the binary image, each original pattern number will be associated with a particular grayscale value. As described above, there are 512 original pattern numbers.

In accordance with the systems and methods of this invention, the grayscale test pattern image is stored in the test pattern image data memory 281. Next, the grayscale value and position circuit 262 of the look-up table generating subsystem 260 performs an analysis on the test pattern image to determine both the grayscale value of each patch and the location of each pixel within that patch. After the grayscale value and position circuit 262 determines the grayscale values of the test pattern image, the grayscale values and pixel position data is stored in the test pattern image grayscale memory 282.

The controller 210 initiates a process to compare the test pattern grayscale image with a corresponding halftoned image. Specifically, the controller 210 controls the halftoning circuit 240 to perform a halftoning operation on the input test pattern image stored in the test pattern image data memory 281. More specifically, for example, a standard error-diffusion technique, such as the Floyd-Steinberg technique may be used to generate a binarized image from the input grayscale test pattern image. Alternatively, a dither process, or any other known binarizing process, may be used to obtain the binarized image. As a result, a binarized image is generated by the halftoning circuit 240 and is stored in the binary image data memory 284. The binarized image corresponds to the original test pattern image. Next, it is necessary to analyze the binary image data stored in the binary image data memory 284. This analysis is performed in part by the pixel pattern determiner 264.

However, it should be recognized that the systems and methods of the invention are not limited to generating the binary image by performing a halftoning process on a grayscale image. Rather, the systems and methods of the invention may also include separately inputting corresponding binary and grayscale images. These corresponding binary and grayscale images could be selected based on expert knowledge, for example.

The pixel pattern determiner 264 uses the sliding window technique to analyze the binary image data. Illustratively, the modeling and reconstruction system 200 uses the a 3×3 sliding window 430. After the test pattern image is halftoned by the halftoning circuit 240, the pixel pattern determiner 264 scans the sliding 3×3 window 430 across the image data of the binary image stored in the binary image data memory 284.

The pixel pattern determiner 264 scans the sliding window 430, or any other appropriate window, across the pixels of each patch of the test pattern image 420 shown in FIG. 5. The window 430 is scanned in the fast scan direction. As the sliding window 430 scans across the pixels, information will be generated for a particular specified pixel at a given time, i.e., the target pixel. Illustratively, when using the window 430 shown in FIG. 6, the target pixel will be the pixel located at the center, i.e., at the coordinates (1,1), of the sliding window. As a result, information generated for the target pixel will depend not only on the particular image value of the target pixel for which information is generated, but will also depend upon the image value of the pixels which neighbor the target pixel, i.e., the neighborhood of the target pixel.

During operation of the modeling and reconstruction system 200 as the pixel pattern determiner 264 slides the window over the binary image to determine the patterns, the pattern number generator 268 generates a pattern number for each observed pattern. The histogram generator 266 inputs the generated pattern number and the grayscale value of the corresponding target pixel in the test pattern image. The histogram generator 266 generates from this information a histogram plotting the frequency distributions of the observed patterns relative to the grayscale values. This frequency distribution data is stored in the binary image data memory 284.

As described above, the binary image is analyzed by the pixel pattern determiner 264 using a selected window, such as the 3×3 window 430 shown in FIG. 6. Based on the observed pattern in the binarized image appearing in the window 430, the pattern number generator 268 determines an original pattern number for each observed pattern and assigns that original pattern number to the target pixel in the window at each scanning position. The original pattern number is determined by the pattern number generator 268 based on the binary data value of the target pixel and the neighboring pixels. As used herein, the "original pattern number" denotes a pattern number directly obtained from the observed (i.e., unrotated) binary image data for the target pixel.

As the pixel pattern determiner 264 scans the sliding window 430 across the binary image to be analyzed, a multitude of patterns can be observed through the sliding window 430. The original pattern number of each of these patterns will be determined by the pattern number generator 268, as outlined above with respect to FIGS. 12 and 13. However, it should be appreciated that different position-dependent values can be used for the pixel positions of the particular window used. Each obtained original pattern number and the associated target pixel coordinates are stored in the binary image data memory 284.

The pixel pattern determiner 264 will scan across the binary image until the entire image is scanned. At the conclusion of the scanning process, each pixel in the binary image will, at one time or another, have been the target pixel. As a result, each pixel in the binary image will be assigned an original pattern number by the pattern number generator 268.

The target pixel associated with each unique pattern corresponds to a particular grayscale value. Further, the grayscale value associated with each pixel is stored in the test pattern image grayscale memory 282.

Then, the histogram generator 266 uses the fact that there are 126 sets of rotated patterns. Specifically, the histogram generator 266 associates each of the original pattern numbers of the four patterns that form a set of rotated patterns with a unique pattern number. The histogram generator 266 uses this unique pattern number to represent the four patterns of that set.

It should be appreciated that the unique pattern number may be, and preferably is, the same as the pattern number of one of the four patterns in each set. In this case, the histogram generator 266 will select an original pattern number that satisfies a particular protocol as the unique pattern number. For example, the smallest "original pattern number" of the patterns of the set may be designated as the "unique pattern number". Thereafter, the histogram generator 266 estimates the pattern numbers for the four different rotations of the pattern and associates an "unique pattern number" by using the smallest pattern number.

Alternatively, the histogram generator 266 may generate an association table in the look-up table memory 287. The association table is searchable by original pattern number. For an input original pattern number, the association table will output the unique pattern number associated with the input original pattern number. However, this alternative technique requires more memory than the technique described above.

Then, the histogram generator 266 groups all the original pattern numbers, which have grayscale values associated with them, with each respective unique pattern number. Next, the histogram generator 266 determines the mean grayscale value $g_i$ for each unique pattern number based on the frequency of occurrence $f_{ij}$ of each grayscale value j for a particular original pattern numbers i. The histogram generator 266 uses all the grayscale values associated with a unique pattern number and determines the mean grayscale value for each unique pattern. For example, this process may be performed using the relationship:

$$g_i = \frac{\sum_{j=0}^{255} j f_{ij}}{\sum_{j=0}^{255} f_{ij}} \forall i = 0, \ldots, 511 \quad (3)$$

where:

$g_i$ is the mean grayscale value for a unique pattern number;

j is a grayscale value of an original pattern number; and $f_{ij}$ is the frequency of occurrence of each grayscale value j.

Based on the relationship set forth in Eq. 3, the mean grayscale value for each unique pattern may be determined. However, it should be recognized that the determination of the mean grayscale value for each unique pattern is not limited to the analysis according to Eq. 3. Rather, the mean or average grayscale value for each unique pattern may be determined in any suitable known or later developed manner. Then, the histogram generator 266 stores each unique pattern number and its associated mean grayscale value into the look-up table stored in the look-up table memory 287.

The modeling and reconstruction system 200 creates a look-up table requiring limited storage. The look-up table may be created with 132 8-bit unique entries, for example. The look-up table is used to reconstruct a grayscale image from a binary image.

It should be recognized that the systems and methods of this invention are not limited to using a look-up table. Alternatively, the mapping between data, for example between binary image data and grayscale image data, may be accomplished by mapping using a system of equations that processes information regarding input data to generate output data. For example, a Boolean logic technique may be employed using a logical sum of products. Alternatively, it should be recognized that the mapping may be accomplished using expert knowledge in a wide variety of ways to relate input data to desired output data. Once the look-up table generating subsystem 260 has generated the look-up table and it is available in the look-up table memory 287, the modeling and reconstruction system 200 is able to convert a variety of binary images to an equivalent grayscale image. The binary image to be converted is input, or has been previously input, from the image data source 100 through the input/output interface 220 under control of the controller 210.

It should be recognized that, in accordance with the exemplary modeling and reconstruction system 200 described above, the modeling and reconstruction system 200 performs both the training process to create a look-up table, as well as the implementation of the look-up table to transform a binary image to a corresponding grayscale image. However, it should be recognized that the systems and methods of the invention are not limited to one system. Rather, the system to create a look-up table in accordance with the invention may be physically separate from the system in which the look-up table is ultimately implemented. Specifically, a modeling system may create the look-up table. Further, a reconstruction system may use the created look-up table to convert a binary image to a grayscale image in accordance with the systems and methods of the invention. Accordingly, such a reconstruction system may be characterized as an image conversion system that converts a binary image to a grayscale image.

The input binary image for conversion to a grayscale image is analyzed using the window 430 shown in FIG. 6, or any other known or later developed window. Specifically, the binary image is analyzed using the binary image analyzing circuit 270. During operation, the pixel pattern determiner 272 scans the binary image, progressing from target pixel to target pixel. For each target pixel, the pixel pattern determiner 272 observes a pixel pattern of the neighborhood of the target pixel. Further, the pixel pattern determiner 272 generates data that associates each pattern with its corresponding target pixel and stores the data in the binary image data memory 284.

As the scanning process is performed, or alternatively at the completion of the scanning process, the pixel pattern number determiner 274 determines the original pattern number for each observed target pixel based on the pattern associated with each target pixel, i.e., the neighborhood of each target pixel. Then, the pixel pattern number determiner 274 determines if the pattern must be rotated. This is accomplished by either using a given protocol or an association table to associate each rotation with its unique pattern number, as described above. Accordingly, each original pattern number will be converted into a unique pattern number.

The look-up table grayscale value extractor 276, based on the unique pattern number obtained for each pixel in the binary image, extracts a corresponding grayscale value from the look-up table. Specifically, the look-up table grayscale value extractor 276 uses the look-up table stored in look-up table memory 287. The look-up table contains all of the unique pattern numbers and the corresponding grayscale values. Accordingly, the look-up table grayscale value extractor 276 can extract the grayscale value that corresponds to the observed unique pattern number. As a result, the grayscale value assignor 278 associates each pixel in the binary image with an appropriate grayscale value. Once all of the pixels are associated with a grayscale value, a reconstructed grayscale image is generated. This grayscale image may then be directly output by the controller 210 to the image data sink 300.

Alternatively, the controller 210 controls the image data filtering circuit 290 to apply further processing to the generated grayscale image to reduce or eliminate noise in the image. Illustratively, the modeling and reconstruction system 200 includes a filters parameters memory 286 that stores, for example, conditional average filter parameters. Alternatively, a minimum, median or maximum filter may be used. In experiments on the grayscale image reconstruction systems and methods according to this invention, a simple 3×3 average filter was used because of its simplicity. Such a 3×3 average filter yielded a reasonably good reconstruction of the original grayscale image. The choice of the filter used will affect, to a certain extent, the sharpness of the generated image.

It should be recognized that filtering the generated grayscale image is only one rather simple approach to enhancing the reconstructed image. Any other known or later developed technique for filtering and/or enhancing the resulting grayscale image can also be used.

For example, the modeling and reconstruction system 200 may include the segmenter/edge detector circuit 250, for example. The segmenter/edge detector circuit 250 detects the edges in the estimated grayscale image. Subsequent to modeling and reconstructing the grayscale image, an enhancement filter can be applied to the edge regions detected by the segmenter/edge detector circuit 250 and an averaging process may be performed on the remainder of the grayscale image. In other words, the segmenter/edge detector circuit 250 can designate or tag edge portions in the image and correct for any deficiencies in those edge portions. Accordingly, the segmenter/edge detector circuit 250 provides an alternative technique for reconstructing of a binary image using the look-up table generated according to the invention.

As described above, the modeling and reconstruction system 200 needs to be trained only once. Further, the modeling and reconstruction system 200 may be trained for a number of different halftoning schemes, e.g., error-diffusion schemes, for example. Illustratively, for error-diffused color images, the same look-up table generated for black and white images may be used for all of the color separation layers.

Figure 14:
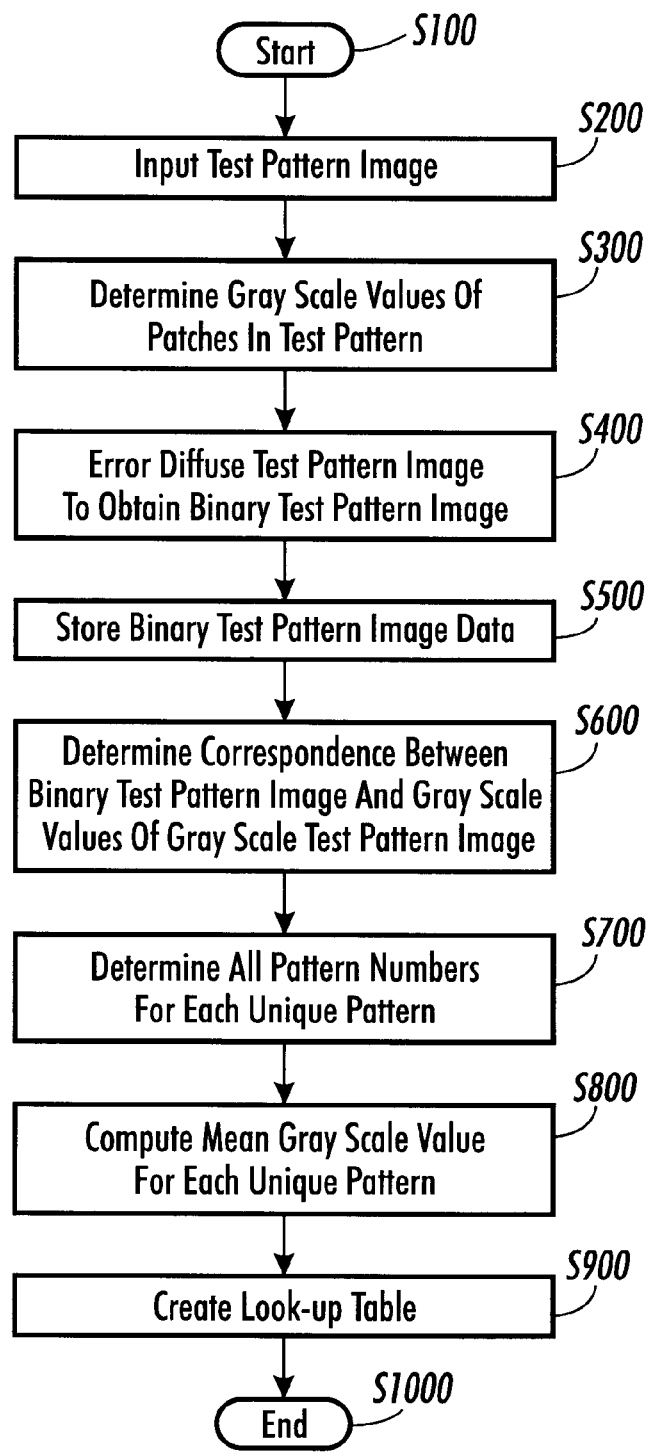
FIG. 14 is a flowchart outlining one exemplary embodiment of a method for modeling a grayscale image from a halftone image in accordance with this invention.

FIG. 14 is a flowchart outlining one exemplary embodiment of a training method according to this invention. It is necessary to perform the training method at least once before a reconstruction process can be performed. As shown in FIG. 14, the training process begins in step S100, and continues to step S200.

In step S200, a test pattern image is input. The test pattern may be any suitable grayscale image. The test pattern contains areas of different grayscale values. Then, in step S300, the grayscale value of each pixel in each area within the test pattern is determined. The areas may be constant-valued patches, for example. Next, in step S400, the test pattern is halftoned to obtain a binary test pattern image that corresponds to the grayscale test pattern image. Control then continues to step S500.

In step S500, the binary image is stored. Next, in step S600, the correspondence between the binary test pattern image and the grayscale values of the grayscale test pattern image is determined. Then, in step S700, for each unique pattern, the original pattern numbers that correspond to that unique pattern are determined. Control then continues to step S800.

In step S800, the mean grayscale value for each unique pattern is determined. Then, in step S900, a look-up table is created containing the mean grayscale value for each unique pattern. Once the look-up table is created in step S900, a grayscale image may be modeled and reconstructed from a binary image using the look-up table. Next, in step S1000, the training method ends.

Figure 15:
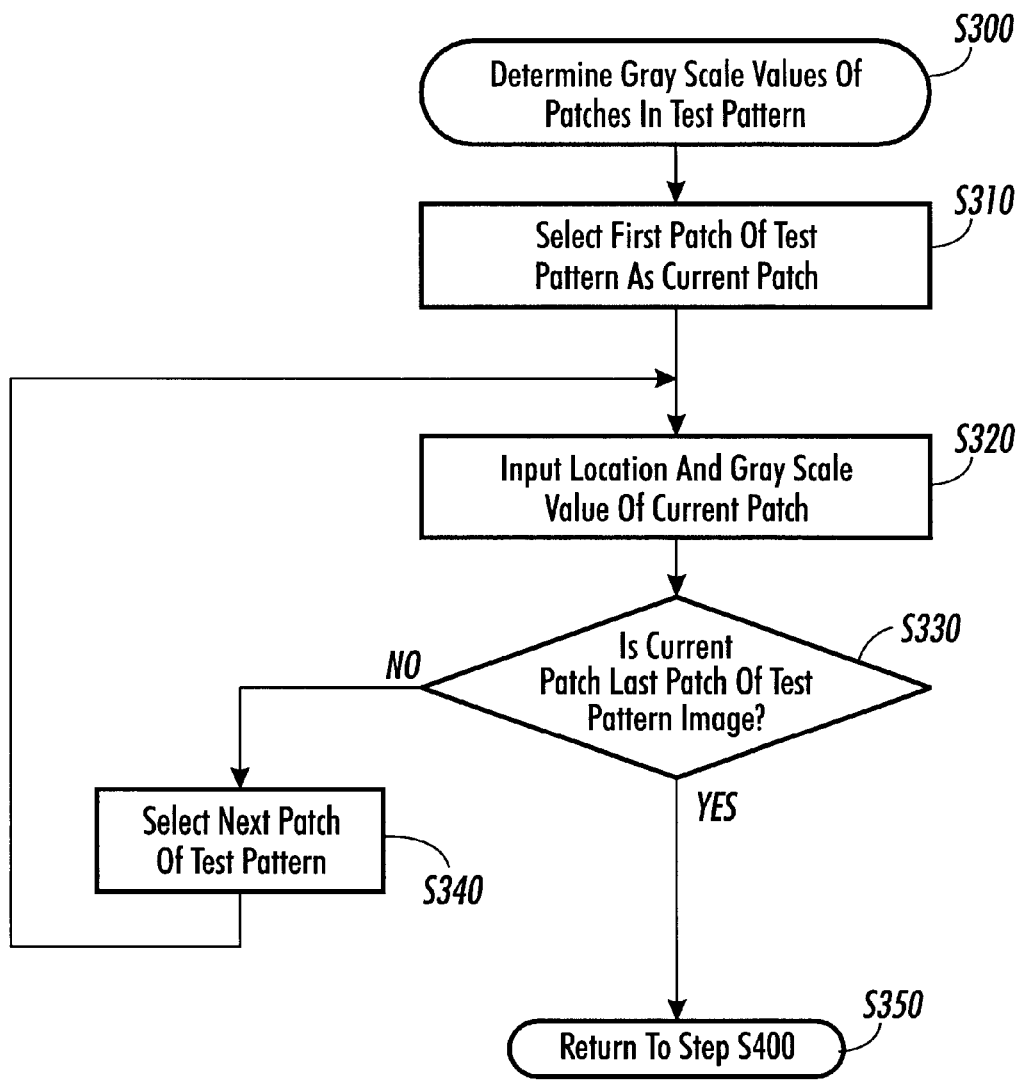
FIG. 15 is a flowchart outlining in greater detail one exemplary embodiment of the grayscale determining step of FIG. 14.

FIG. 15 is a flowchart outlining in greater detail one exemplary embodiment of determining the grayscale values of the patches in the test pattern of step S300 of FIG. 14. Beginning in step S300, control continues to step S310. In step S310, the first patch of the test pattern is selected as the current patch to be analyzed. Then, in step S320, the grayscale value and location of that patch in the input grayscale image is determined. Next, in step S330, the current patch is analyzed to determine if the current patch is the last patch of the test pattern image.

In step S330, if the current patch is not the last patch of the test pattern image, control continues to step S340. Otherwise control jumps to step S350. In step S340, the next patch of the test pattern image is selected. Control then returns to step S320. In step S350, control returns to step S400.

Figure 16:
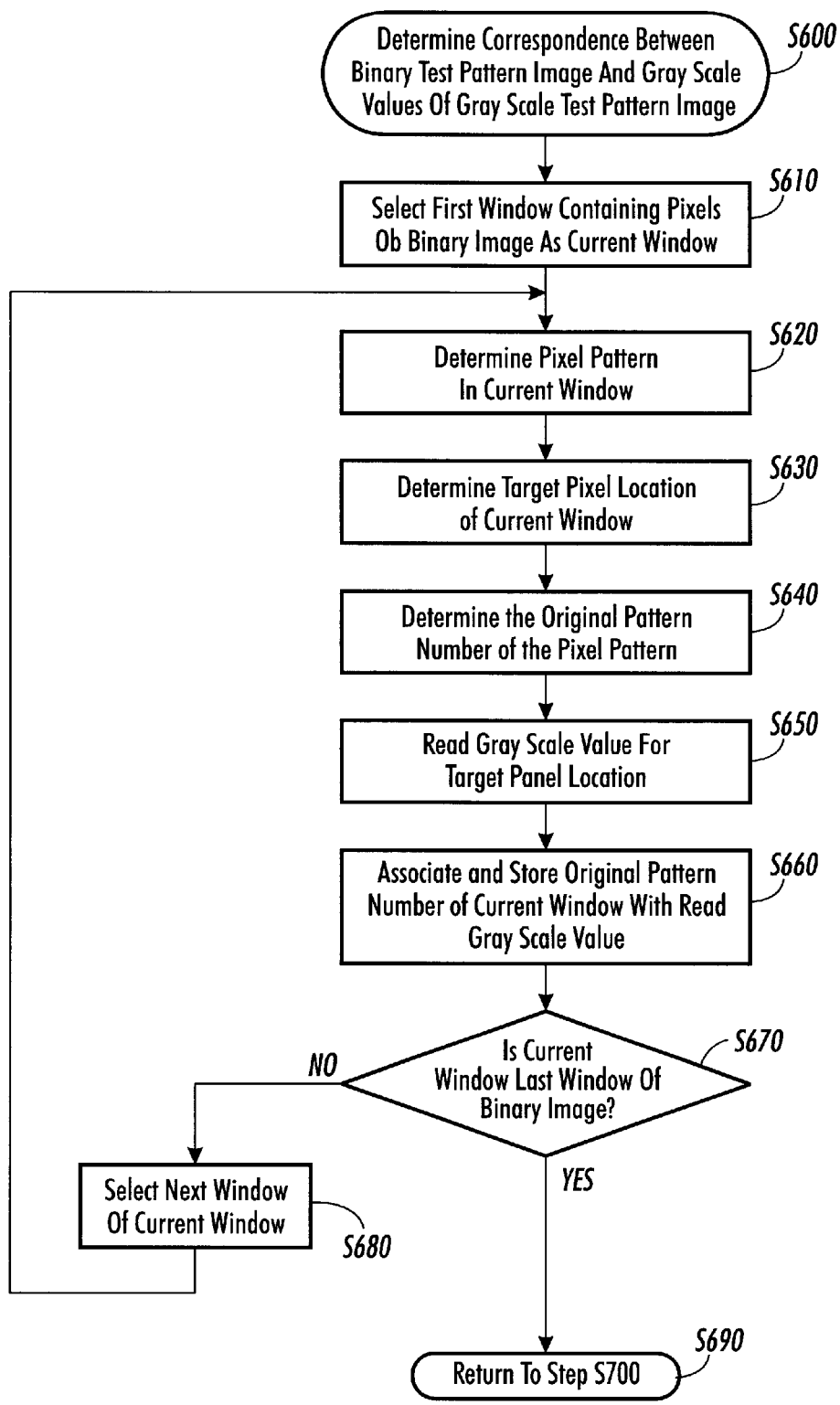
FIG. 16 is a flowchart outlining in greater detail one exemplary embodiment of the correspondence determining step of FIG. 14.

FIG. 16 is a flowchart outlining in greater detail one exemplary embodiment of determining the correspondence between the binary test pattern image and grayscale values of the test pattern image of step S600 of FIG. 14. Beginning in step S600, control continues to step S610. In step S610, the first window of the binary image containing pixels is selected as the current window to be analyzed. Next, in step S620, the pixel pattern in the current window is determined. Then, in step S630, the target pixel location of the current window is determined. Control then continues to step S640.

In step S640, the original pattern number of the pixel pattern observed in the current window is determined. Then, in step S650, the grayscale value for the target pixel of the current window is read. Next, in step S660, the original pattern number of the current window is associated and stored with the grayscale value of the current window. Control then continues to step S670.

In step S670, the current window of the binary image is analyzed to determine if the current window is the last window. If the current window is not the last window of the binary image, control continues to step S680. Otherwise, if the current window is the last window of the binary image, control jumps to step S690. In step S680, the next window of the binary image is selected. Control then returns to step S620. In contrast, in step S690, control returns to step S700.

Figure 17:
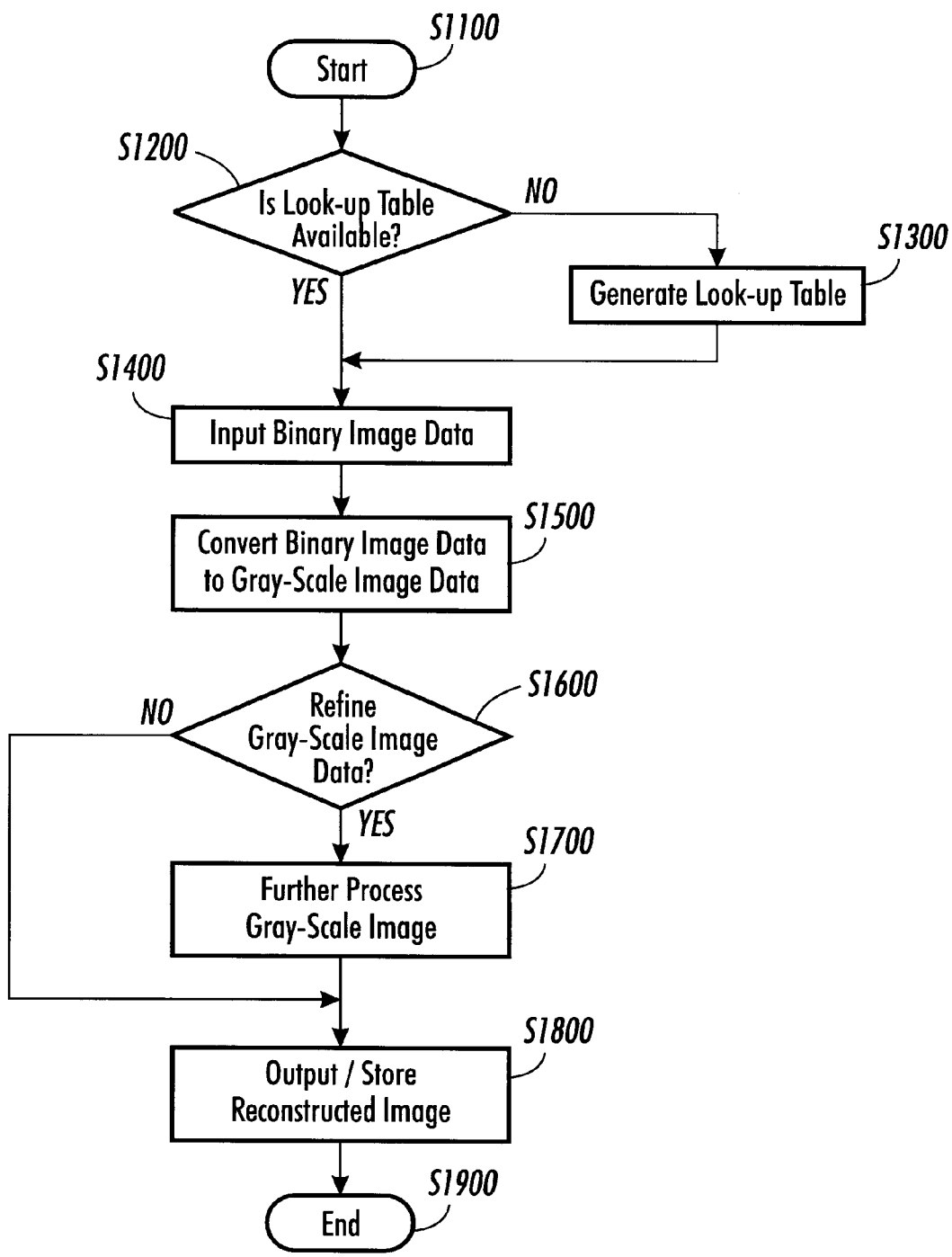
FIG. 17 is a flowchart outlining one exemplary embodiment of a method for modeling and reconstructing a grayscale image from a binary image in accordance with this invention.

FIG. 17 is a flowchart outlining one exemplary method of modeling and reconstructing a grayscale image from a binary image according to the invention. It should be recognized that the process shown in FIG. 17 assumes that the training process illustrated in FIG. 14 has previously been performed and that, as a result, an appropriate look-up table has been generated. As described above, it is necessary to perform the training process only once for each type of halftoning.

Beginning in step S1100, control continues to step S1200. In step S1200, the status of the look-up table is checked to determine if an appropriate look-up table is available for the type of halftoning used in the binary image to be converted. If an appropriate look-up table is not available, control continues to step S1300. Otherwise, if a look-up table is available, then control jumps directly to step S1400. In step S1300, the appropriate look-up table is generated. The look-up table may be generated using the method illustrated in FIG. 14, for example. Control then continues to step S1400.

In step S1400, the binary image data to be analyzed is input. Next, in step S1500, the binary image data is converted to grayscale image data. Then, in step S1600, a determination is made whether the generated grayscale image will be further refined. If so, control passes to step S1700. Otherwise, if the grayscale image is not to be further refined, then control passes directly to step S1800. In step S1700, further processing is accomplished on the grayscale image to refine and/or enhance the grayscale image. Control then passes to step S1800.

In step S1800, the reconstructed image is output or stored. Then, in step S1900, the grayscale image reconstruction process ends.

Figure 18:
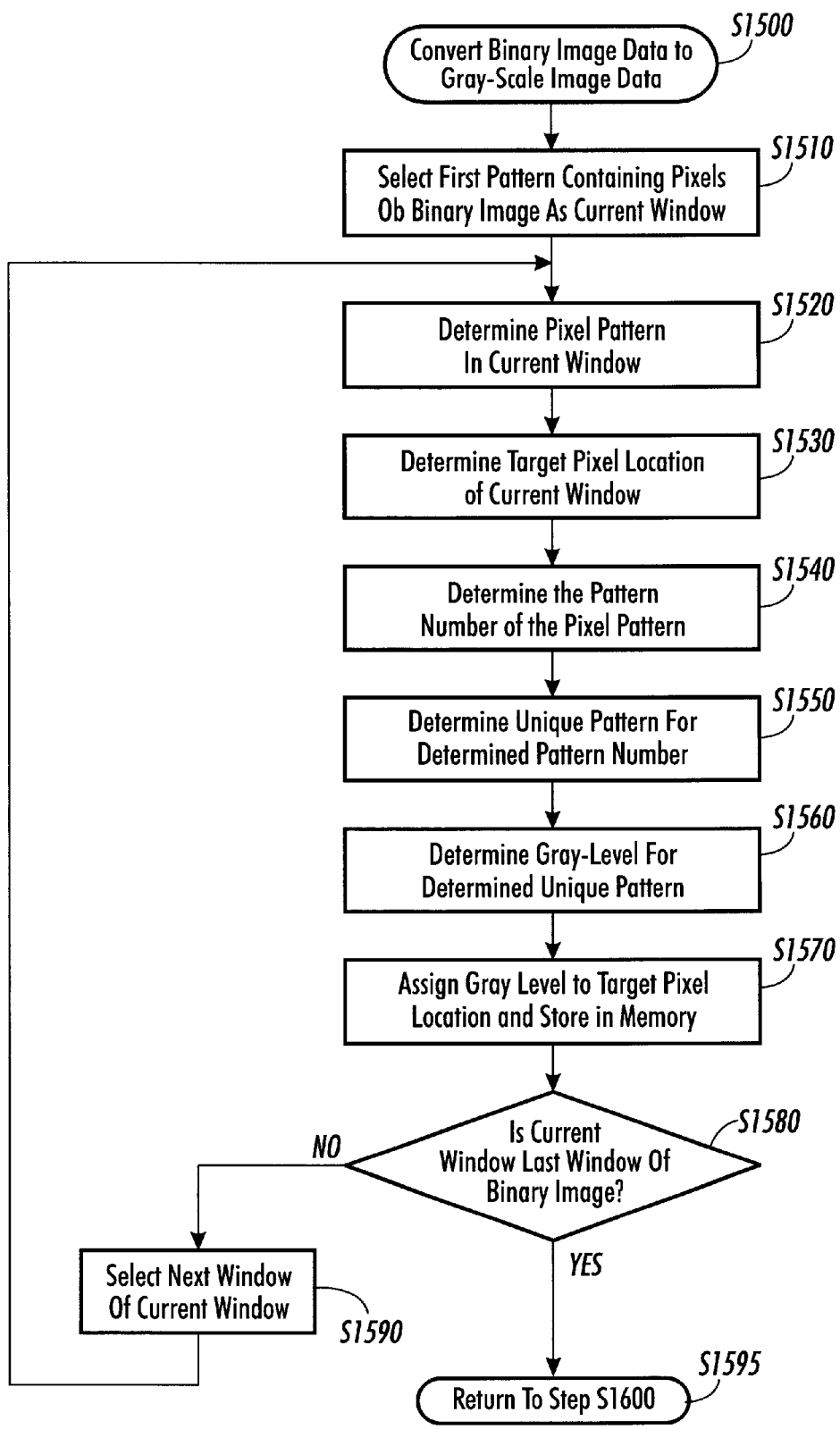
FIG. 18 is a flowchart outlining in greater detail one exemplary embodiment of the binary to grayscale conversion step of FIG. 16.

FIG. 18 is a flowchart outlining in greater detail one exemplary embodiment of converting the binary image data to grayscale image data of step S1500 of FIG. 17. Beginning in step S1500, control continues to step S1510. In step S1510, the first portion of the binary image containing pixels is selected as the current window to be analyzed. Then, in step S1520, the pixel pattern in the current window is determined. Next, in step S1530, the target pixel location of the current window is determined. Control then continues to step S1540.

In step S1540, the original pattern number of the pixel pattern observed in the current window is determined. Then, in step S1550, the unique pattern that is associated with the determined original pattern number is determined. Next, in step S1560, the grayscale value for the determined unique pattern is read from the look-out table. Control then passes to step S1570.

In step S1570, the determined grayscale value is assigned to the target pixel location of the current window. Next, in step S1580, the current window of the binary image is analyzed to determine if the current window is the last window. If the current window is not the last window of the binary image, control continues to step S1590. Otherwise, if the current window is the last window of the binary image, control jumps to step S1595.

In step S1590, the next window of the binary image is selected. Control then returns to step S1520. In contrast, in step S1595, control returns to step S1600

It should be recognized that, in accordance with the systems and methods of the invention, a set of look-up tables can be generated during the training phase for each of various different types of halftoning methods. Then, during the image reconstruction phase, an appropriate look-up table that is optimized for the binary image may be selected and used to obtain a grayscale image. The determination of the appropriate look-up table could be accomplished using any one of a variety of known or later developed techniques. For example, the look-up table could be selected based simply on a user's input or based on the characteristics of the output device that printed the binary image. Alternatively, the selection of the look-up table may be based on an analysis of the binary image, such as, for example, a segmentation analysis performed on the input image to determine the halftoning method. If no information could be gathered about the input binary image, a generic look-up table may be used to reconstruct the grayscale image.

Figure 19:
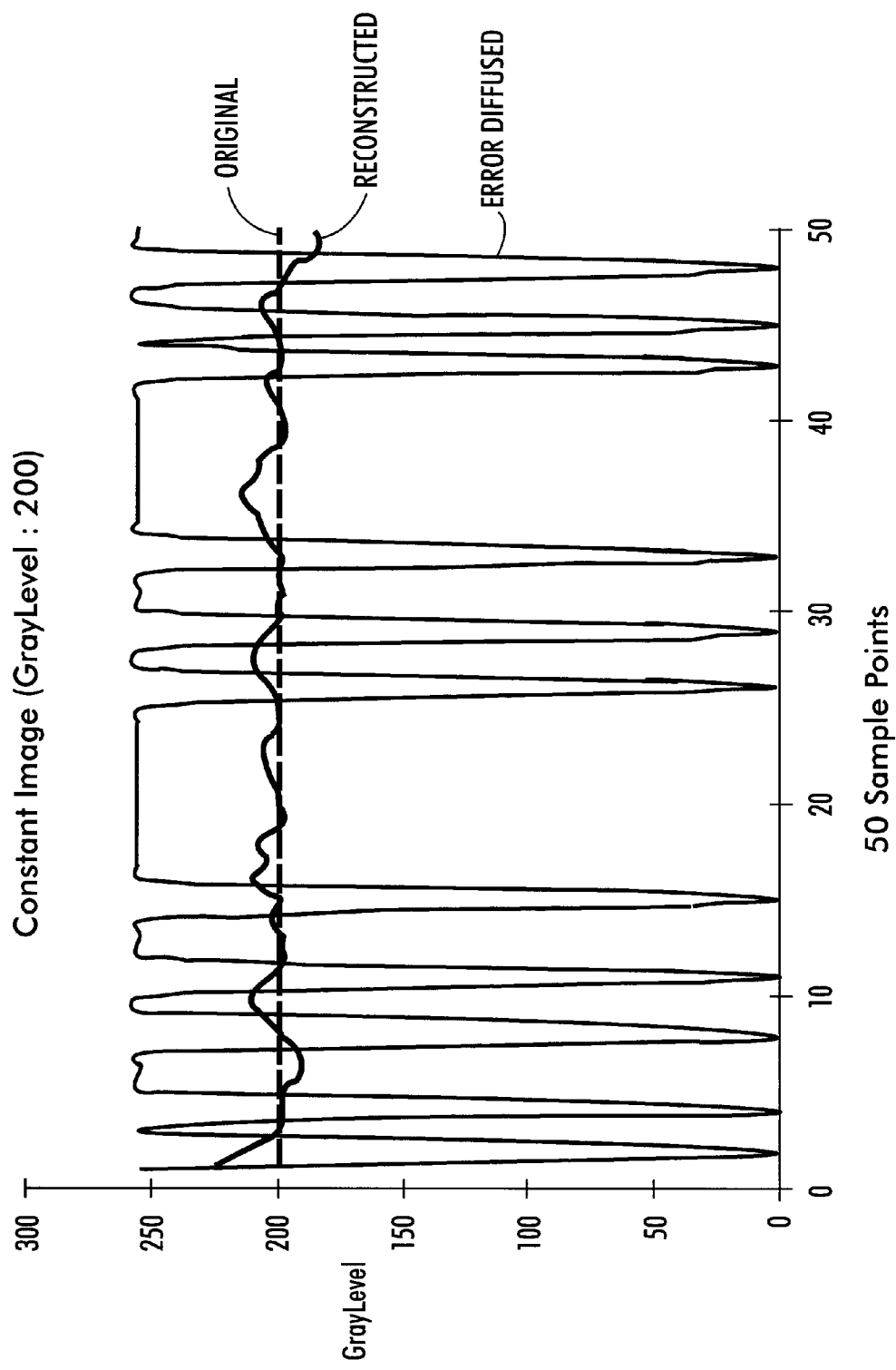
FIG. 19 is a graph showing a projection of a scanline depicting halftone and grayscale values versus pixel position for a constant-color image in accordance with the invention.
Figure 20:
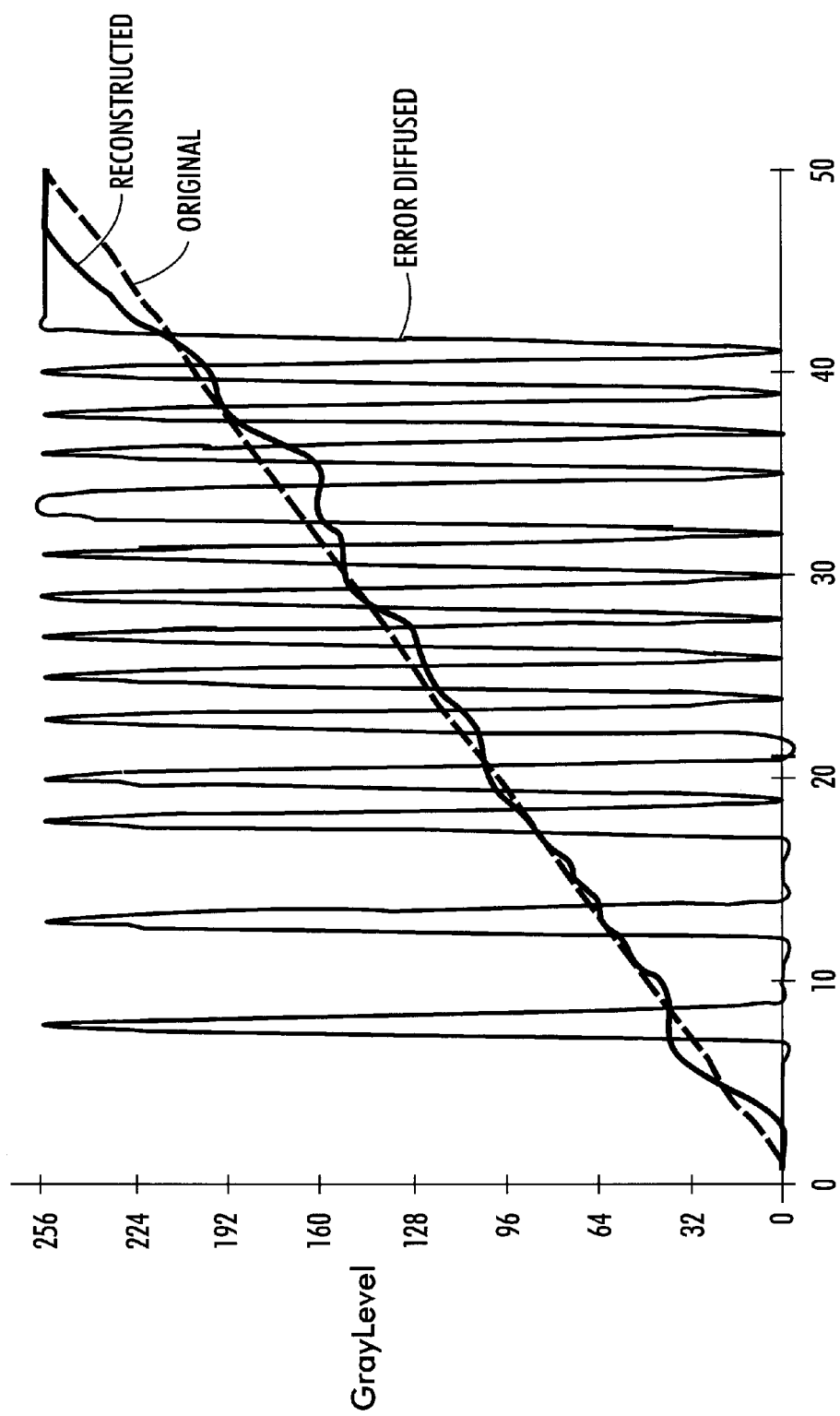
FIG. 20 is a graph showing a projection of a scanline depicting halftone and grayscale values versus pixel position for a slice of a sweep image in accordance with the invention.
Figure 21:
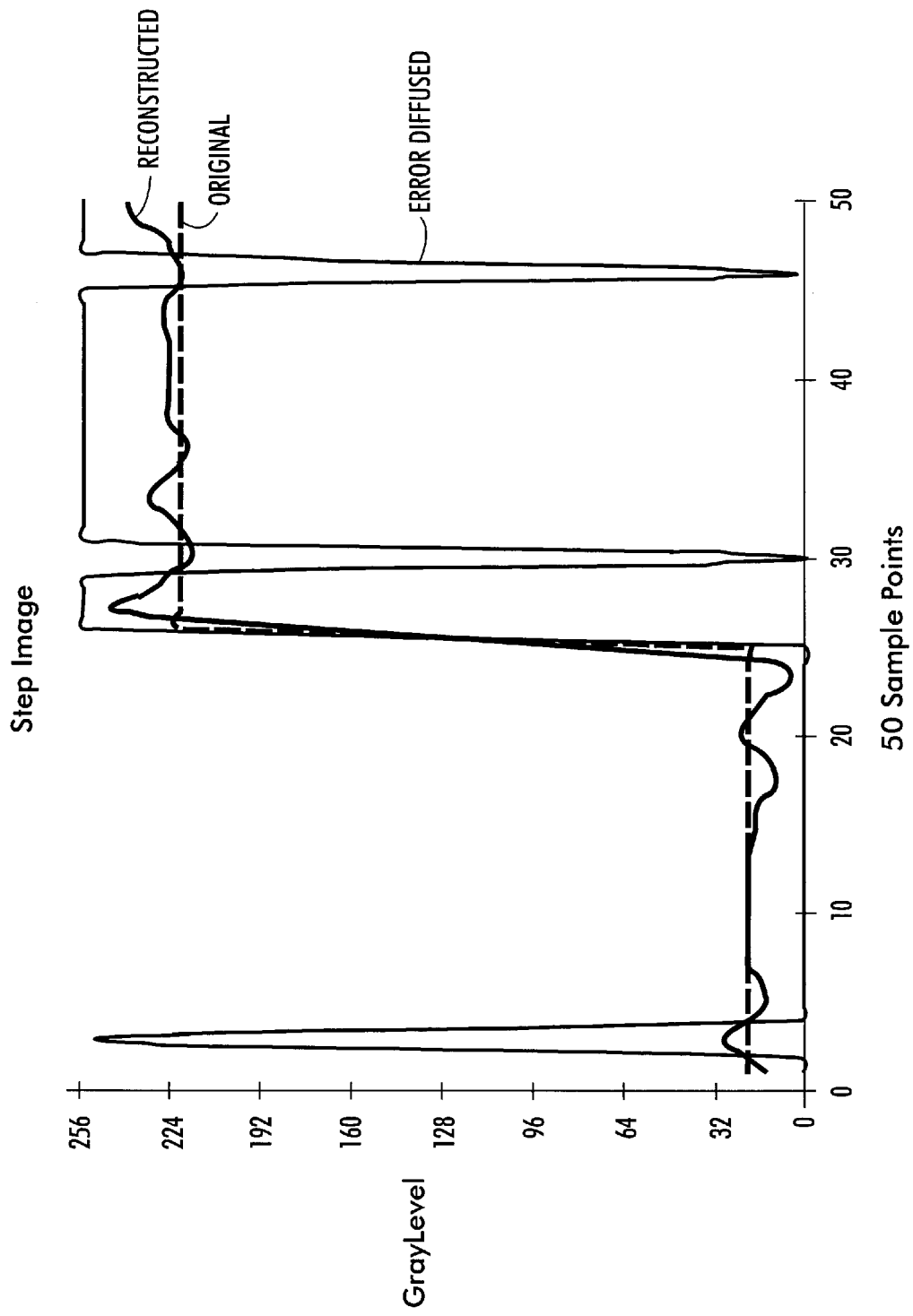
FIG. 21 is a graph showing a projection of a scanline depicting halftone and grayscale values versus pixel position for a step image in accordance with the invention.

FIGS. 19–21 are graphs showing the performance of the modeling and reconstruction systems and methods according to the invention. Specifically, the graphs of FIGS. 19–21 plot the grayscale values on the y-axis against the projection of a scanline having 50 sample points on the x-axis. The graphs in FIGS. 19–21 each depict the grayscale values of the 50 pixels in original image, the 50 pixels in the error diffused binary image, and the 50 pixels in the reconstructed image. Specifically, FIG. 19 shows the grayscale values for 50 pixels having a constant grayscale value of 200. FIG. 20 shows the grayscale values of the 50 pixels as the grayscale values are swept at constant rate from zero to 256. FIG. 21 shows the grayscale values of the 50 pixels as the constant grayscale value of approximately 20 for the first 25 pixels and a step-change to approximately 220 for the last 25 pixels. As is apparent from each of FIGS. 19–21, there is substantial correlation between the original image and the reconstructed image obtained using the systems and methods of the invention.

Figure 22:
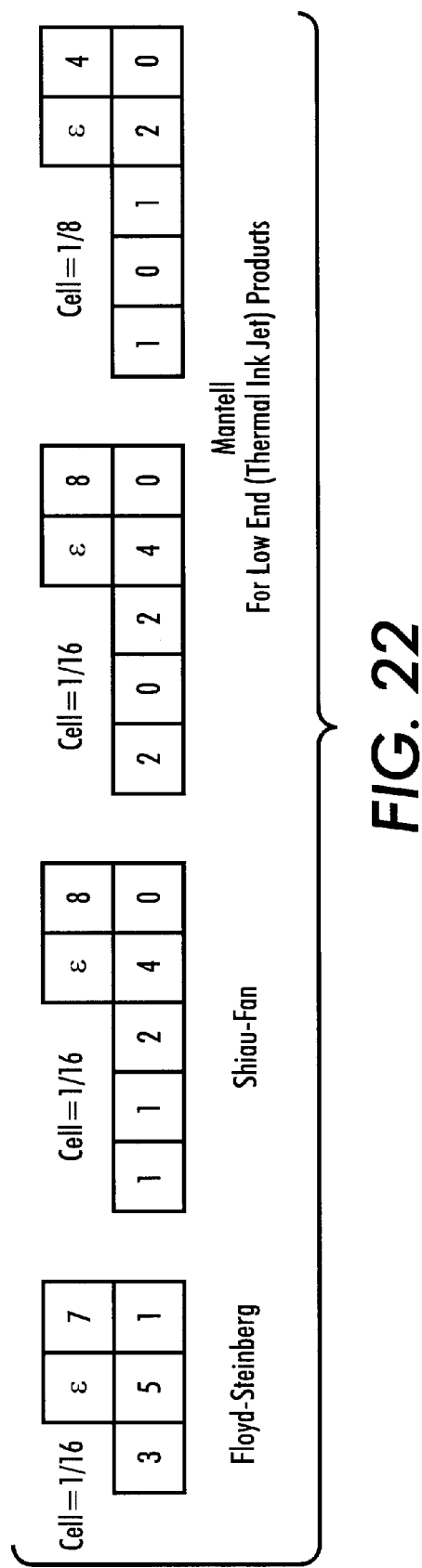
FIG. 22 is a diagram showing different error-diffusion weights used to test the robustness of the look-up table generated in accordance with the invention.

It should be recognized that the systems and methods of this invention may be used for images processed by different error-diffusion methods. Further, it should be appreciated that a single look-up table may be used for different error-diffusion methods. A set of experiments was performed to test the robustness of using one generic look-up table for different error-diffusion methods. Specifically, one generic look-up table was used with different error-diffusion methods including the Floyd-Steinberg method, the Shiau-Fan method, and the Mantell method. Parameters including noise profile and the pixel growth compensation were obtained for each reconstructed image. In particular, the Shiau-Fan method was used to observe noise profile and pixel growth. FIG. 22 shows different error-diffusion weights used to test the robustness of the single look-up table used with different error-diffusion methods.

Further, Tables 1–3 included below include a variety of error measures associated with each of the methods. Specifically, Table 1 shows the error associated with each of the methods before and after the filtering the same input image Table 1 reveals that the errors are quite comparable between the different methods. As a result, it should be appreciated that one look-up table may be effectively used for reconstructing grayscale images from images binarized using different error-diffusion schemes.

TABLE 1

| | After LUT | | After Filtering | |
| --- | --- | --- | --- | --- |
| | MSE | PSNR | MSE | PSNR |
| Floyd | 0.0076 | 37.61 | 0.0020 | 40.60 |
| Shiau-Fan | 0.0091 | 37.22 | 0.0020 | 40.57 |
| Mantell | 0.0091 | 37.22 | 0.0022 | 40.32 |
| Shiau-Fan w/noise profile | 0.0096 | 37.11 | 0.0021 | 40.48 |
| Shiau-Fan w/pixel growth | 0.0113 | 36.75 | 0.0047 | 38.80 |

Errors from reconstruction of different error diffusion methods

Table 2 includes information regarding errors in the modeling and reconstruction process for different window types. Table 2 shows that the one of the better results is obtained for a 3×3 window with a center at (1,1).

TABLE 2

| | After LUT | | After Filtering | |
| --- | --- | --- | --- | --- |
| | MSE | PSNR | MSE | PSNR |
| 3 × 3 window, center (1,1) | 0.0076 | 37.61 | 0.0020 | 40.60 |
| 3 × 3 window, center (1,0) | 0.0086 | 37.35 | 0.0033 | 39.47 |
| 3 × 3 window w/o corner, center (1,0) | 0.0115 | 36.70 | 0.0038 | 39.12 |
| 5 × 3 window, center (2,1) | 0.0035 | 39.31 | 0.0016 | 41.02 |

Errors obtained using different windows for modeling/reconstruction

Note that a 5×3 window with center at (2,1) gives the best results. However, the improvement in performance when using a 5×3 window was not significant compared to the cost increase associated with increasing the look-up table size. Further, the 3×2 window was tested, but did not provide enough data for reconstruction. As a result, the 3×2 window data is not shown in the comparison.

Table 3 shows errors in reconstruction of a pictorial (photograph) image using a 3×3 window in conjunction with a 132 entry by 8-bit look-up table. Also, Table 3 includes information regarding three other images that were experimented on. These images include an image of a person, a text image and a mixed (both text and photograph) color image.

TABLE 3

| 3 × 3 window, center (1,1) | After LUT | | After Filtering | |
|---|---|---|---|---|
| | MSE | PSNR | MSE | PSNR |
| Photograph | 0.0076 | 37.61 | 0.0020 | 40.60 |
| Person | 0.0149 | 36.03 | 0.0040 | 38.91 |
| Text | 0.0072 | 35.15 | 0.0050 | 35.95 |
| Mixed color image | 0.1238 | 37.49 | 0.0282 | 39.04 |

Errors in reconstruction of different images with a 3 × 3 window (132 × 8 LUT)

Table 3 shows comparisons made both after using the look-up table and also after filtering the images. As is apparent from Table 3, the modeling and reconstruction systems and methods of the invention attain very favorable results and provide both an effective and efficient process by which a binarized image may be converted into an estimated grayscale image.

Accordingly, the modeling and reconstruction systems and methods of this invention inverse halftone a binary image using templates to restore multilevel image data from binary image data, such as error-diffused data, for example. The systems and methods according to the invention employ pattern matching on the binary image to determine an output grayscale value for each target pixel of the grayscale image. The template storage required is reduced by averaging all gray values for patterns which are rotations of other patterns. Once the reconstructed grayscale image is formed any conventional image enhancement technique may be applied, such as filtering techniques, for example.

The modeling and reconstruction system 200 shown in FIGS. 1–4 is preferably implemented on a programmed general purpose computer. However, the modeling and reconstruction 200 shown in FIGS. 1–4 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 14–18, can be used to implement the modeling and reconstruction 200.

In particular, it should be understood that each of the circuits shown in FIGS. 1–4 can be implemented as portions of a suitably programmed general purpose computer. Alternatively, each of the circuits shown in FIGS. 1–4 can be implemented as physically distinct hardware circuits within an ASIC, or using a FPGA, a PDL, a PLA or a PAL, or using discrete logic elements or discrete circuit elements. The particular form each of the circuits shown in FIGS. 1–4 will take is a design choice and will be obvious and predicable to those skilled in the art.

The memory 280 is preferably implemented using static or dynamic RAM. However, the memory 280 can also be implemented using a floppy disk and disk drive, a writable optical disk and disk drive, a hard drive, flash memory or any other known or later developed alterable volatile or non-volatile memory device or system.

While this invention has been described in conjunction with specific embodiments outlined above, it is evident that many alternative modifications and variations may be apparent to those skilled in the art. Accordingly, the exemplary embodiments of the invention as set forth herein are intended to be illustrative, not limiting. Various changes may be made without departing from the spirit and scope of the invention.

What is claimed is:

1. A method for associating binary image values with grayscale image values suitable for converting a binary image into a grayscale image comprising:

inputting a grayscale image;

inputting a binary image;

identifying patterns of binary pixel data occurring in the binary image;

determining, within the binary pixel data, at least one pattern that corresponds to and is a rotation of another pattern in the binary pixel data;

grouping the at least one pattern and at least the another pattern into a pattern group;

associating the patterns in the pattern group with a corresponding grayscale image value in the grayscale image; and storing data representative of the pattern group and the corresponding grayscale image value to associate the data representative of the pattern group and the corresponding grayscale image value.

2. The method according to claim 1, wherein inputting the binary image comprises binarizing the grayscale image to generate the input binary image.

3. The method according to claim 1, wherein the grayscale image and the binary image each are input separately.

4. The method according to claim 1, wherein determining at least one pattern that corresponds to and is a rotation of at least another pattern comprises identifying patterns that are at least one of 90°, 180°, or 270° rotations relative to each other.

5. The method according to claim 1, wherein storing data representative of the pattern group and the corresponding grayscale image value to associate the data representative of the pattern group and the corresponding grayscale image value is performed using a look-up table.

6. The method according to claim 1, wherein grouping the at least one pattern and at least another pattern into a pattern group includes:

identifying the at least one pattern as a unique pattern; and associating each pattern in the binary image that is a rotation of the unique pattern with the unique pattern.

7. The method according to claim 6, wherein each of the patterns are represented in the form of a pattern number.

8. The method according to claim 7, wherein the value of the number of the unique pattern number is smaller than the value of the pattern number of each pattern in the binary image that is a rotation of the unique pattern.

9. The method according to claim 6, wherein the unique pattern is stored in a look-up table, and each pattern in the binary image that is a rotation of the unique pattern is not stored in the look-up table.

10. The method according to claim 9, wherein the look-up table includes at most 134 entries, the entries including the unique pattern number and an associated grayscale image value.

11. The method according to claim 1, wherein associating the patterns in the pattern group with a corresponding grayscale image value includes:
   determining an associated grayscale image value for each of the patterns in the pattern group; and
   analyzing the associated grayscale image values to determine a representative grayscale image value for the pattern group.

12. The method according to claim 11, wherein analyzing the associated grayscale image values to determine a representative grayscale image value includes averaging the associated grayscale image values to determine a mean grayscale image value.

13. A method for converting a binary image into a grayscale image comprising:
   inputting a binary image;
   identifying patterns of binary pixel data occurring in the binary image;
   determining, within the binary pixel data, at least one pattern that corresponds to and is a rotation of another pattern in the binary pixel data;
   associating the identified patterns of the binary image with corresponding grayscale image values; and
   generating at least a portion of a grayscale image from a corresponding portion of the binary image based on the grayscale image value associated with the identified patterns.

14. The method according to claim 13, wherein determining at least one pattern that corresponds to and is a rotation of at least another pattern comprises identifying patterns that are at least one of 90°, 180°, or 270° rotations to each other.

15. The method according to claim 13, wherein determining at least one pattern that corresponds to and is a rotation of another pattern in the binary pixel data includes:
   identifying at least one pattern in the binary pixel data; and
   associating the at least one pattern with a unique pattern.

16. The method according to claim 15, wherein associating identified patterns of the binary image with corresponding grayscale image values includes:
   determining a grayscale image value that corresponds to the unique pattern; and
   associating the grayscale image value that corresponds to the unique pattern number with the identified at least one pattern.

17. The method according to claim 16, wherein each of the patterns are represented in the form of a pattern number.

18. The method according to claim 17, wherein the value of the number of the unique pattern number is smaller than the value of the pattern number of each pattern in the binary image that is a rotation of the unique pattern.

19. The method according to claim 18, wherein associating identified patterns of the binary image with corresponding grayscale image values is performed using a look-up table.

20. The method according to claim 19, wherein the unique pattern is stored in the look-up table, and each pattern in the binary image that is a rotation of the unique pattern is not stored in the look-up table.

21. The method according to claim 20, wherein the look-up table includes at most 134 entries, the entries including the unique pattern number and an associated grayscale image value.

22. The method according to claim 13, wherein associating identified patterns of the binary image with corresponding grayscale image values is performed using a selected look-up table, the selected look-up table selected from a group of look-up tables.

23. The method according to claim 22, further comprising determining the selected look-up table based on the properties of the binary image that is input.

24. The method according to claim 13, further including enhancing the at least a portion of a grayscale image that is generated.

25. The method according to claim 24, wherein enhancing is performed to eliminate noise in the generated grayscale image.

26. The method according to claim 24, wherein the enhancing is performed using filtering.

27. The method according to claim 24, wherein the enhancing includes detecting and enhancing edge portions in the generated grayscale image.

28. An image conversion system for converting a binary image to a grayscale image comprising:
   a look-up table;
   a binary image analyzing circuit that analyzes the binary image to identify pixel patterns in the binary image;
   a pixel pattern number determiner that determines a pixel pattern number of a pixel group for each identified pixel pattern, each pixel group comprising a plurality of pixel patterns that correspond to and are rotations of each other; and
   a look-up table grayscale image value extractor that extracts, for each identified pixel pattern, a grayscale value from the look-up table based on the determined pixel pattern number for that identified pixel pattern.

29. The image conversion system of claim 28, wherein the pixel pattern number determiner determines if an observed pixel pattern is to be rotated.

30. The image conversion system of claim 28, wherein the pixel pattern number determiner associates an observed pattern number with a unique pattern number.

31. The image conversion system of claim 30, wherein the pixel pattern number determiner associates an observed pattern number with a unique pattern number using the look-up table.

* * * * *